(12) United States Patent
Ichikawa et al.

(10) Patent No.: US 11,668,670 B2
(45) Date of Patent: Jun. 6, 2023

(54) GAS SENSOR

(71) Applicant: NGK INSULATORS, LTD., Aichi (JP)

(72) Inventors: Daichi Ichikawa, Nagoya (JP); Taku Okamoto, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 177 days.

(21) Appl. No.: 17/143,188

(22) Filed: Jan. 7, 2021

(65) Prior Publication Data

US 2021/0208095 A1    Jul. 8, 2021

(30) Foreign Application Priority Data

Jan. 8, 2020   (JP) .............................. JP2020-001586

(51) Int. Cl.
| | |
|---|---|
| *G01N 27/409* | (2006.01) |
| *G01N 27/41* | (2006.01) |
| *G01N 27/407* | (2006.01) |
| *G01N 27/419* | (2006.01) |

(52) U.S. Cl.
CPC ....... *G01N 27/409* (2013.01); *G01N 27/4073* (2013.01); *G01N 27/41* (2013.01); *G01N 27/419* (2013.01)

(58) Field of Classification Search
CPC .. G01N 27/409; G01N 27/4073; G01N 27/41; G01N 27/4071; G01N 27/4163; G01N 27/417–419; G01N 27/48
See application file for complete search history.

(56) References Cited

U.S. PATENT DOCUMENTS

2009/0242427 A1\* 10/2009 Muroguchi .......... G01N 27/419
                                                                     205/781

FOREIGN PATENT DOCUMENTS

JP        2016-166871 A      9/2016

\* cited by examiner

*Primary Examiner* — Joshua L Allen
*Assistant Examiner* — Vivian A Tran
(74) *Attorney, Agent, or Firm* — Mattingly & Malur, PC

(57) ABSTRACT

A gas sensor includes a main pump cell, a storage unit that stores information about a zero point in a first correspondence relationship, where the first correspondence relationship is a linear correspondence relationship between the oxygen concentration in a measurement-object gas and the main pump current, an oxygen-concentration-detecting unit that detects the oxygen concentration in a measurement-object gas, based on a measured value p of the main pump current and the information about the zero point, and a measured-value-obtaining unit that performs a second control process and that obtains a measured value b1 at a measurement point B1 at which a known value of the oxygen concentration and the main pump current are relevant to each other with a measurement timing. The oxygen-concentration-detecting unit makes zero point correction such that a divergence of the zero point from the first correspondence relationship is corrected based on the measured value b1.

8 Claims, 4 Drawing Sheets

GAS SENSOR

CROSS-REFERENCE TO RELATED APPLICATION

The application claims priority to Japanese Patent Application No. 2020-001586 filed in the Japan Patent Office on Jan. 8, 2020, the entire contents of which are incorporated herein by reference.

BACKGROUND OF THE INVENTION

1. Field of the Invention

The present invention relates to a gas sensor.

2. Description of the Related Art

A known gas sensor detects the concentration of specific gas such as NOx in measurement-object gas such as exhaust gas of an automobile. PTL 1, for example, discloses a gas sensor that includes a sensor element that has oxygen ion conducting solid electrolyte layers, a main pump cell, an auxiliary pump cell, and a measurement electrode that is disposed in the solid electrolyte layers. In the case where a NOx concentration is detected by using the gas sensor, the main pump cell and the auxiliary pump cell pump out or pump into oxygen between a measurement-object gas flow section in the sensor element and a location outside the sensor element, and an oxygen concentration in the measurement-object gas flow section is adjusted. After the oxygen concentration is adjusted, NOx in the measurement-object gas is reduced around the measurement electrode. The NOx concentration in the measurement-object gas is detected based on a pump current that flows when oxygen around the measurement electrode is pumped out.

CITATION LIST

Patent Literature

[PTL 1] Japanese Unexamined Patent Application Publication No. 2016-166871 A

SUMMARY OF THE INVENTION

A main pump current that flows through the main pump cell when the oxygen concentration in the measurement-object gas flow section is adjusted correlates with the oxygen concentration in the measurement-object gas around the sensor element. In view of this, it is thought that the oxygen concentration in the measurement-object gas around the sensor element is detected based on the main pump current. However, the present inventors have investigated and found that a correspondence relationship between the oxygen concentration and the main pump current changes in the wake of the use of the gas sensor, and the accuracy of detection of the oxygen concentration based on the main pump current decreases in some cases. As for the detection of the oxygen concentration in the measurement-object gas, there is a particular need to detect that the oxygen concentration is zero with precision.

The present invention has been accomplished to solve such a problem, and it is a main object of the present invention to inhibit the accuracy of detection of the oxygen concentration from decreasing in the wake of the use of the gas sensor when the oxygen concentration in the measurement-object gas is zero.

The present invention takes a measure described below to achieve the main object described above.

A gas sensor according to the present invention includes an element body that has an oxygen ion conducting solid electrolyte layer and that contains a measurement-object gas flow section into which measurement-object gas is introduced for circulation, a preliminary pump cell that pumps oxygen into a preliminary chamber of the measurement-object gas flow section, a main pump cell that adjusts an oxygen concentration in a first interior space of the measurement-object gas flow section that is located downstream of the preliminary chamber, an auxiliary pump cell that adjusts the oxygen concentration in a second interior space of the measurement-object gas flow section that is located downstream of the first interior space, a measurement electrode that is disposed in a measurement chamber of the measurement-object gas flow section that is located downstream of the second interior space, a reference electrode that is disposed in the element body and that comes into contact with reference gas that is serving as a reference for detection of a specific gas concentration in the measurement-object gas, a measurement-voltage-detecting unit that detects a measurement voltage between the reference electrode and the measurement electrode, a specific-gas-concentration-detecting unit that performs a first control process, that obtains a detection value depending on oxygen that is produced in the measurement chamber derivatively from specific gas, based on the measurement voltage while the first control process is performed, and that detects the specific gas concentration in the measurement-object gas, based on the detection value, the first control process including a preliminary pump control process of controlling the preliminary pump cell such that a constant preliminary pump current flows through the preliminary pump cell, an auxiliary pump control process of controlling the auxiliary pump cell such that the oxygen concentration in the second interior space becomes a target concentration, and a main pump control process of controlling the main pump cell such that an auxiliary pump current that flows when the auxiliary pump cell adjusts the oxygen concentration in the second interior space becomes a target value, a storage unit that stores information about a zero point at which an oxygen concentration of zero and a main pump current are relevant to each other in a first correspondence relationship, where the first correspondence relationship is a linear correspondence relationship between the oxygen concentration in the measurement-object gas and the main pump current that flows through the main pump cell while the first control process is performed, an oxygen-concentration-detecting unit that detects the oxygen concentration in the measurement-object gas, based on a measured value p of the main pump current that flows while the first control process is performed and the information about the zero point that is stored in the storage unit, and a measured-value-obtaining unit that performs a second control process and that obtains a measured value b1 at a measurement point B1 at which a known value of the oxygen concentration and the main pump current are relevant to each other by measuring the main pump current that flows while the second control process is performed with a measurement timing with which the oxygen concentration in the measurement-object gas around the element body is regarded as the known value, the second control process including a preliminary pump stop process of stopping operation of the preliminary pump cell, the auxiliary pump control process, and the main pump control process. The oxygen-concentration-detecting unit makes zero point correction to correct the measured value p or the information about the zero point such that a divergence of the zero point from the first correspondence relationship is corrected based on the measured value b1 at the measurement point B1.

The gas sensor performs the first control process including the preliminary pump control process of controlling the preliminary pump cell such that the constant preliminary pump current flows, the auxiliary pump control process of controlling the auxiliary pump cell such that the oxygen concentration in the second interior space becomes the target concentration, and the main pump control process of controlling the main pump cell such that the auxiliary pump current that flows when the auxiliary pump cell adjusts the oxygen concentration in the second interior space becomes the target value. The specific-gas-concentration-detecting unit detects the specific gas concentration in the measurement-object gas while the first control process is performed. The oxygen-concentration-detecting unit also detects the oxygen concentration in the measurement-object gas, based on the measured value p of the main pump current that flows while the first control process is performed and the information about the zero point of the linear first correspondence relationship between the oxygen concentration in the measurement-object gas and the main pump current that flows while the first control process is performed. When a foreign substance such as soot is accumulated in the measurement-object gas flow section in the wake of the use of the gas sensor, a correspondence relationship between the actual oxygen concentration and the main pump current after the accumulation diverges from the first correspondence relationship before the accumulation. More specifically, the inclination of the correspondence relationship after the accumulation is less than that of the first correspondence relationship, and the zero point diverges. The inclination is a ratio of an increase in the main pump current to an increase in the oxygen concentration, and the zero point is a point at which an oxygen concentration of zero and the main pump current at this time are relevant to each other. The following reason can be thought. The foreign substance is likely to be accumulated near the entrance of the measurement-object gas flow section. The more the foreign substance is accumulated near the entrance, the more diffusion resistance near the entrance of the measurement-object gas flow section, and the smaller the amount of the measurement-object gas that flows into the measurement-object gas flow section. Consequently, even when the oxygen concentration in the measurement-object gas has the same value, the amount of oxygen that flows into the measurement-object gas flow section from the outside decreases, and the main pump current decreases. For this reason, it is thought that the more the foreign substance is accumulated, the smaller the inclination of the correspondence relationship after the accumulation as compared with the inclination of the first correspondence relationship before the accumulation. Oxygen that is pumped into by the preliminary pump cell does not entirely flow toward the first interior space in the downstream direction, but a part thereof moves in the upstream direction and flows from element body to the outside via the entrance of the measurement-object gas flow section. Of the oxygen that is pumped into by the preliminary pump cell, the proportion of the oxygen that flows in the downstream direction changes when the foreign substance is accumulated near the entrance. Specifically, the more the foreign substance is accumulated near the entrance, the larger the proportion of the oxygen that flows in the downstream direction, and the value of the main pump current overall increases. For this reason, it is thought that the zero point of the correspondence relationship after the accumulation diverges in a direction in which the main pump current increases as compared with the zero point of the first correspondence relationship before the accumulation. In particular, the zero point changes from the first correspondence relationship, and the accuracy of detection of the oxygen concentration when the oxygen concentration in the measurement-object gas is zero consequently decreases. In the gas sensor according to the present invention, however, the measured-value-obtaining unit performs the second control process including the preliminary pump stop process of stopping operation of the preliminary pump cell, the auxiliary pump control process, and the main pump control process with the measurement timing with which the oxygen concentration in the measurement-object gas around the element body is regarded as the known value and measures the main pump current that flows while the second control process is performed to obtain the measured value b1 at the measurement point B1 at which the known value of the oxygen concentration and the main pump current are relevant to each other. In the second control process, the preliminary pump stop process is included, oxygen is not pumped into by the preliminary pump cell, and the zero point of the correspondence relationship between the oxygen concentration and the main pump current while the second control process is performed consequently does not change even when the foreign substance is accumulated as described above. In the second control process, the main pump control process and the auxiliary pump control process are included as in the first control process, and the inclination of the correspondence relationship between the oxygen concentration and the main pump current during the first control process is consequently equal to that during the second control process. When the inclination of the correspondence relationship during the first control process changes from the inclination of the first correspondence relationship due to the accumulation of the foreign substance described above, the inclination of the correspondence relationship during the second control process also changes. For this reason, the measured value b1 at the measurement point B1 that is measured during the second control process is not affected by the change in the zero point described above but is affected by the change in the inclination described above, and the measured value b1 correlates with the degree of the change in the inclination described above. The degree of the change in the inclination correlates with the degree of the accumulation of the foreign substance near the entrance of the measurement-object gas flow section, that is, the degree of the increase in the diffusion resistance near the entrance and hence correlates with the amount of the divergence of the zero point from the first correspondence relationship. For this reason, the measured value b1 at the measurement point B1 also correlates with the amount of the divergence of the zero point from the first correspondence relationship. In view of this, in the gas sensor according to the present invention, the oxygen-concentration-detecting unit makes the zero point correction to correct the measured value p or the information about the zero point such that the divergence of the zero point from the first correspondence relationship described above is corrected based on the measured value b1 at the measurement point B1. Consequently, the divergence of the zero point from the first correspondence relationship at least in the wake of the use of the gas sensor can be corrected, and the accuracy of detection of the oxygen concentration when the oxygen concentration in the measurement-object gas is zero can be inhibited from decreasing in the wake of the use of the gas sensor.

In this case, the storage unit may store a second correspondence relationship that represents a linear correspondence relationship between the oxygen concentration in the measurement-object gas and the main pump current that flows while the second control process is performed, and the oxygen-concentration-detecting unit may make the zero point correction, based on a difference between the second correspondence relationship that is stored in the storage unit and the measurement point B1. As for the correspondence relationship between the oxygen concentration and the main pump current during the second control process, only the inclination changes and the zero point does not change even when the foreign substance is accumulated as described above. For this reason, the difference between the second correspondence relationship that is stored in advance and the measurement point B1 is not affected by the change in the zero point described above and correlates with the degree of the change in the inclination described above. For this reason, the zero point correction can be made based on the difference between the second correspondence relationship and the measurement point B1.

In the gas sensor according to the present invention, the measured-value-obtaining unit may obtain a measured value a1 at a measurement point A1 at which the known value of the oxygen concentration and the main pump current are relevant to each other by measuring the main pump current that flows while the first control process is performed with the measurement timing, and the oxygen-concentration-detecting unit may make the zero point correction, based on the measured value b1 and the measured value a1. The measured value b1 at the measurement point B1 correlates with the degrees of the changes in the inclination of the correspondence relationship during the first control process and during the second control process due to the accumulation of the foreign substance as described above. The measured value a1 is a value during the first control process and is affected by both of the change in the inclination and the change in the zero point as described above. For this reason, the divergence of the zero point from the zero point of the first correspondence relationship due to the accumulation of the foreign substance can be grasped based on the measured value b1 and the measured value a1, and the zero point correction can be consequently appropriately made.

In this case, the oxygen-concentration-detecting unit may derive an inclination K1 that is a value changed from an inclination of a straight line that represents the first correspondence relationship, based on the measurement point B1, may derive a changed zero point corresponding to a zero point after the zero point of the first correspondence relationship diverges, based on a straight line that passes through the measurement point A1 and that has an inclination equal to the inclination K1 and may make the zero point correction, based on the changed zero point. In this way, the zero point correction can be appropriately made by deriving the changed zero point. In this case, the oxygen-concentration-detecting unit may derive a zero point divergence amount corresponding to the amount of the divergence of the changed zero point from the zero point of the first correspondence relationship and may made the zero point correction, based on the zero point divergence amount.

In this case, the oxygen-concentration-detecting unit may derive the inclination K1 as the inclination of a straight line that passes through the measurement point B1 and a point at which the oxygen concentration and the main pump current are zero. The storage unit may store the second correspondence relationship that represents the linear correspondence relationship between the oxygen concentration in the measurement-object gas and the main pump current that flows while the second control process is performed, and the oxygen-concentration-detecting unit may derive the inclination K1, based on the difference between the second correspondence relationship that is stored in the storage unit and the measurement point B1.

In the gas sensor according to the present invention that obtains the measured value a1 at the measurement point A1, the storage unit may store the first correspondence relationship, and the oxygen-concentration-detecting unit may derive the inclination K1 that is a value changed from the inclination of the straight line that represents the first correspondence relationship, based on the measurement point B1, may derive the straight line that passes through the measurement point A1 and that has the inclination equal to the inclination K1 as a corrected first correspondence relationship, and may detect the oxygen concentration in the measurement-object gas, based on the measured value p and the corrected first correspondence relationship. In this way, not only the zero point correction is made but also the change in the inclination of the first correspondence relationship can be corrected by using the corrected first correspondence relationship, and this improves not only the accuracy of detection of the oxygen concentration when the oxygen concentration in the measurement-object gas is zero but also the accuracy of detection of the oxygen concentration when the oxygen concentration is not zero.

The gas sensor according to the present invention that obtains the measured value a1 at the measurement point A1, the storage unit may store the second correspondence relationship that represents the linear correspondence relationship between the oxygen concentration in the measurement-object gas and the main pump current that flows while the second control process is performed, and the oxygen-concentration-detecting unit may derive a zero point divergence amount corresponding to an amount of the divergence of the zero point from the first correspondence relationship, based on a difference between an amount of divergence between a reference value b0 that is a value of the main pump current relevant to the known value of the oxygen concentration in the second correspondence relationship and the measured value b1, and an amount of divergence between a reference value a0 that is a value of the main pump current relevant to the known value of the oxygen concentration in the first correspondence relationship and the measured value a1 and may make the zero point correction, based on the zero point divergence amount. The amount of divergence between the reference value b0 and the measured value b1 correlates with the change in the inclination from the first correspondence relationship and the second correspondence relationship due to the accumulation of the foreign substance, and the amount of divergence between the reference value a0 and the measured value a1 correlates with the change in the inclination and the change in the zero point from the first correspondence relationship described above. For this reason, a difference (for example, a difference or a ratio) between these amounts of divergence correlates with the change in the zero point from the first correspondence relationship. Accordingly, the zero point divergence amount can be derived based on the difference between these amounts of divergence, and the zero point correction can be appropriately made by using the zero point divergence amount.

In this case, the oxygen-concentration-detecting unit may derive a changed zero point corresponding to a zero point after the zero point of the first correspondence relationship diverges, based on the zero point of the first correspondence relationship and the zero point divergence amount, may derive a straight line that passes through the measurement point A1 and the changed zero point as a corrected first correspondence relationship and may detect the oxygen concentration in the measurement-object gas, based on the measured value p and the corrected first correspondence relationship. In this way, not only the zero point correction is made but also the change in the inclination of the first correspondence relationship can be corrected by using the corrected first correspondence relationship. Accordingly, not only the accuracy of detection of the oxygen concentration when the oxygen concentration in the measurement-object gas is zero but also the accuracy of detection of the oxygen concentration when the oxygen concentration is not zero are improved.

In the gas sensor according to the present invention, the measurement timing may be a timing with which the measurement-object gas around the element body is regarded as an atmosphere. When the measurement-object gas is the atmosphere, the oxygen concentration is regarded as the known value, and the measured value b1 can be appropriately obtained by regarding this timing as the measurement timing.

In this case, the measurement-object gas is exhaust gas of an internal combustion engine, includes an information-obtaining unit obtaining fuel-cutoff-carrying-out information that represents fuel cutoff is carried out in the internal combustion engine, and the measured-value-obtaining unit may detect the measurement timing, based on the obtained fuel-cutoff-carrying-out information. The exhaust gas of the internal combustion engine during the fuel cutoff is regarded as the atmosphere, and the measured-value-obtaining unit can consequently appropriately detect the measurement timing in a manner in which the measurement timing is detected based on the fuel-cutoff-carrying-out information.

A gas sensor that can be thought to differ from the gas sensor according to the present invention described above includes an element body that has an oxygen ion conducting solid electrolyte layer and that contains a measurement-object gas flow section into which measurement-object gas is introduced for circulation, a main pump cell that adjusts an oxygen concentration in a first interior space that is formed in the measurement-object gas flow section, an auxiliary pump cell that adjusts the oxygen concentration in a second interior space of the measurement-object gas flow section that is located downstream of the first interior space, a measurement electrode that is disposed in a measurement chamber of the measurement-object gas flow section that is located downstream of the second interior space, a reference electrode that is disposed in the element body and that comes into contact with reference gas that is serving as a reference for detection of a specific gas concentration in the measurement-object gas, a measurement-voltage-detecting unit that detects a measurement voltage between the reference electrode and the measurement electrode, a specific-gas-concentration-detecting unit that performs an auxiliary pump control process of controlling the auxiliary pump cell such that the oxygen concentration in the second interior space becomes a target concentration and a main pump control process of controlling the main pump cell such that an auxiliary pump current that flows when the auxiliary pump cell adjusts the oxygen concentration in the second interior space becomes a target value, that obtains a detection value depending on oxygen that is produced in the measurement chamber derivatively from specific gas, based on the measurement voltage while the auxiliary pump control process and the main pump control process are performed, and that detects the specific gas concentration in the measurement-object gas, based on the detection value, a storage unit that stores a specific gas concentration correspondence relationship that is a correspondence relationship between the specific gas concentration in the measurement-object gas and the detection value, a measured-value-obtaining unit that performs the auxiliary pump control process and the main pump control process and that obtains a measured value b1 at a measurement point B1 at which a known value of the oxygen concentration and the main pump current are relevant to each other by measuring the main pump current that flows while the auxiliary pump control process and the main pump control process are performed with a measurement timing with which the oxygen concentration in the measurement-object gas around the element body is regarded as the known value. The specific-gas-concentration-detecting unit detects the specific gas concentration, based on the detection value and the specific gas concentration correspondence relationship that is stored in the storage unit, and the specific-gas-concentration-detecting unit corrects the detection value or the specific gas concentration correspondence relationship, based on the measured value b1 at the measurement point B1.

The more the foreign substance such as soot is accumulated in the measurement-object gas flow section in the wake of the use of the gas sensor, the more the diffusion resistance near the entrance of the measurement-object gas flow section, and the smaller the amount of the measurement-object gas that flows into the measurement-object gas flow section as described above, and even when the oxygen concentration in the measurement-object gas has the same value, the main pump current consequently decreases. For this reason, the more the foreign substance is accumulated, the smaller the inclination of the correspondence relationship between the oxygen concentration in the measurement-object gas and the main pump current while the main pump control process and the auxiliary pump control process are performed. Similarly, the more the foreign substance is accumulated, the smaller the detection value even when the specific gas concentration in the measurement-object gas has the same value. For this reason, the more the foreign substance is accumulated, the smaller the inclination of the correspondence relationship between the specific gas concentration in the measurement-object gas and the detection value while the main pump control process and the auxiliary pump control process are performed. The rate of the change in the inclination of the correspondence relationship between the oxygen concentration in the measurement-object gas and the main pump current is equal to the rate of the change in the inclination of the correspondence relationship between the specific gas concentration in the measurement-object gas and the detection value. For this reason, the measured value b1 at the measurement point B1 that is measured while the auxiliary pump control process and the main pump control process are performed not only correlates with the degree of the change in the inclination of the correspondence relationship between the oxygen concentration and the main pump current but also correlates with the degree of the change in the inclination of the correspondence relationship between the specific gas concentration and the detection value. In view of this, in this other gas sensor, the specific-gas-concentration-detecting unit corrects the detection value or the specific gas concentration correspondence relationship, based on the measured value b1 at the measurement point B1. In this way, the change in the inclination of the correspondence relationship between the specific gas concentration and the detection value can be corrected, and the accuracy of detection of the specific gas concentration can be consequently inhibited from decreasing in the wake of the use of the gas sensor.

DETAILED DESCRIPTION OF THE INVENTION

Figure 1:
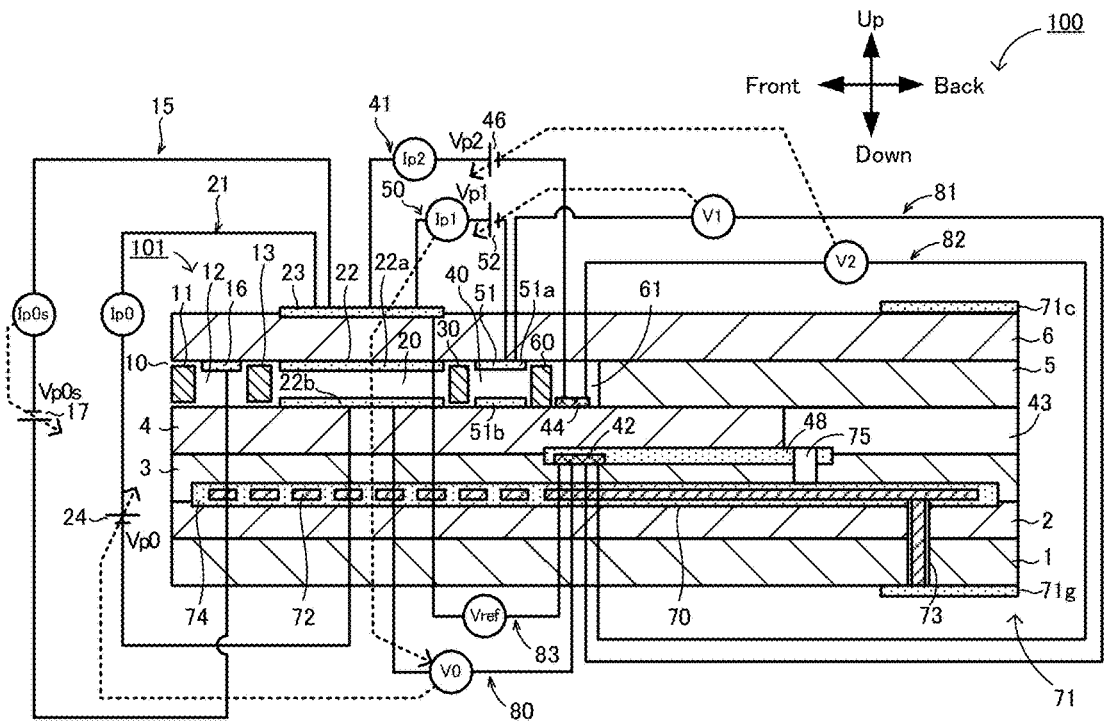
FIG. 1 is a schematic sectional view of a gas sensor 100.
Figure 2:
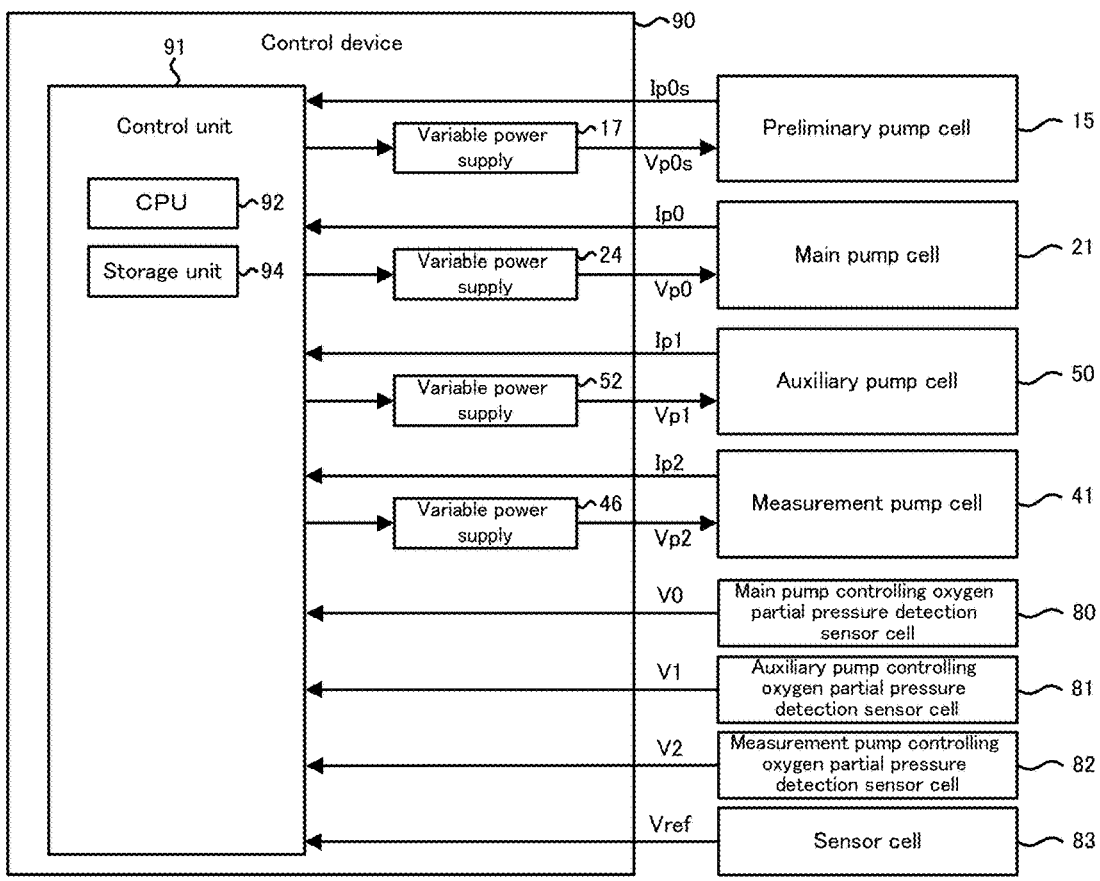
FIG. 2 is a block diagram illustrating relationships in electric connection between a control device 90 and cells.

An embodiment of the present invention will now be described with reference to the drawings. FIG. 1 is a schematic sectional view of an example of the structure of a gas sensor 100 according to an embodiment of the present invention. FIG. 2 is a block diagram illustrating relationships in electric connection between a control device 90 and cells. The gas sensor 100 is mounted in a pipe such as an exhaust gas pipe of an internal combustion engine such as a gasoline engine or a diesel engine. The gas sensor 100 uses the exhaust gas of the internal combustion engine as measurement-object gas to detect the concentration of specific gas such as ammonia or NOx in the measurement-object gas. According to the present embodiment, the gas sensor 100 measures a NOx concentration as a specific gas concentration. The gas sensor 100 includes a sensor element 101 that has an elongated rectangular cuboid shape, cells 15, 21, 41, 50, and 80 to 83 that contain parts of the sensor element 101, and the control device 90 that controls the entire gas sensor 100.

The sensor element 101 has a multilayer body of six layers of a first substrate layer 1, a second substrate layer 2, a third substrate layer 3, a first solid electrolyte layer 4, a spacer layer 5, and a second solid electrolyte layer 6 that are composed of respective oxygen ion conducting solid electrolyte layers such as zirconia ($ZrO_2$) layers and that are stacked in this order from below in the figure. A solid electrolyte of which the six layers are composed is elaborate and airtight. The sensor element 101 is manufactured, for example, in a manner in which a predetermined process and circuit pattern printing, for example, are performed on ceramic green sheets that corresponds to the respective layers, and the sheets are subsequently stacked and fired into an integrally formed piece.

At a position near an end portion (near a left end portion in FIG. 1) of the sensor element 101 between a lower surface of the second solid electrolyte layer 6 and an upper surface of the first solid electrolyte layer 4, a gas inlet 10, a first diffusion controlling portion 11, a buffer space 12, a second diffusion controlling portion 13, a first interior space 20, a third diffusion controlling portion 30, a second interior space 40, a fourth diffusion controlling portion 60, and a third interior space 61 are formed so as to be adjacent to each other and so as to communicate with each other in this order.

The gas inlet 10, the buffer space 12, the first interior space 20, the second interior space 40, and the third interior space 61 are spaces in the sensor element 101 each of which is formed by hollowing the spacer layer 5 such that an upper part is defined by the lower surface of the second solid electrolyte layer 6, a lower part is defined by the upper surface of the first solid electrolyte layer 4, and a side part is defined by a side surface of the spacer layer 5.

Each of the first diffusion controlling portion 11, the second diffusion controlling portion 13, and the third diffusion controlling portion 30 is formed as two slits that are long from side to side (the longitudinal direction of openings is a direction perpendicular to the figure). The fourth diffusion controlling portion 60 is formed as a slit that is formed as a gap adjacent to the lower surface of the second solid electrolyte layer 6 and that is long from side to side (the longitudinal direction of openings is the direction perpendicular to the figure). A portion extending from the gas inlet 10 to the third interior space 61 is also referred to as a measurement-object gas flow section.

A reference gas introducing space 43 is formed at a position that is farther from the end than the measurement-object gas flow section and at a position at which a side part is defined by a side surface of the first solid electrolyte layer 4 between the upper surface of the third substrate layer 3 and the lower surface of the spacer layer 5. For example, the air is introduced, as reference gas when the NOx concentration is measured, into the reference gas introducing space 43.

An air introducing layer 48 is a layer composed of porous ceramic, and the reference gas is introduced into the air introducing layer 48 via the reference gas introducing space 43. The air introducing layer 48 is formed so as to cover a reference electrode 42.

The reference electrode 42 is an electrode formed such that the electrode is interposed between the upper surface of the third substrate layer 3 and the first solid electrolyte layer 4, and the air introducing layer 48 in communication with the reference gas introducing space 43 is disposed therearound as described above. The use of the reference electrode 42 enables an oxygen concentration (an oxygen partial pressure) in the first interior space 20, the second interior space 40, and the third interior space 61 to be measured as described later. The reference electrode 42 is formed as a porous cermet electrode (for example, a cermet electrode composed of Pt and $ZrO_2$).

In the measurement-object gas flow section, the gas inlet 10 is a region opened to the exterior space, and the measurement-object gas is taken in the inside of the sensor element 101 from the exterior space via the gas inlet 10. The first diffusion controlling portion 11 gives a predetermined diffusion resistance to the measurement-object gas that is taken in via the gas inlet 10. The buffer space 12 is formed to guide the measurement-object gas that is introduced via the first diffusion controlling portion 11 toward the second diffusion controlling portion 13. The buffer space 12 also serves as a space (preliminary chamber) used to pump oxygen into the measurement-object gas that is introduced via the first diffusion controlling portion 11. The oxygen is pumped into the buffer space 12 by operation of the preliminary pump cell 15. The second diffusion controlling portion 13 gives a predetermined diffusion resistance to the measurement-object gas that is introduced into the first interior space 20 from the buffer space 12. When the measurement-object gas is introduced from a location outside the sensor element 101 into the first interior space 20, the measurement-object gas that is rapidly taken in the inside of the sensor element 101 via the gas inlet 10 as a result of variation in the pressure of the measurement-object gas in the exterior space (in the case where the measurement-object gas is exhaust gas of an automobile, pulsation of an exhaust pressure) is not directly introduced into the first interior space 20 but is introduced into the first interior space 20 after the variation in the pressure of the measurement-object gas is canceled out via the first diffusion controlling portion 11, the buffer space 12, and the second diffusion controlling portion 13. Consequently, the variation in the pressure of the measurement-object gas that is introduced into the first interior space 20 is almost negligible. The first interior space 20 is formed as a space used to adjust the oxygen partial pressure in the measurement-object gas that is introduced via the second diffusion controlling portion 13. The oxygen partial pressure is adjusted by operation of the main pump cell 21.

The preliminary pump cell 15 is an electrochemical pump cell that includes a preliminary pump electrode 16 that is disposed on substantially the entire lower surface of the second solid electrolyte layer 6 that faces the buffer space 12, an outer pump electrode 23 that is disposed on a part of the outside of the sensor element 101 that is to be exposed to the measurement-object gas, and the second solid electrolyte layer 6 that is interposed between these electrodes. The preliminary pump electrode 16 is disposed at the most upstream position among the electrodes in the measurement-object gas flow section. A variable power supply 17 that is disposed between the preliminary pump electrode 16 and the outer pump electrode 23 applies a pump voltage Vp0s to cause a pump current Ip0s to flow between the preliminary pump electrode 16 and the outer pump electrode 23, and the preliminary pump cell 15 can consequently pump oxygen in the exterior space into the buffer space 12.

The main pump cell 21 is an electrochemical pump cell that includes an inner pump electrode 22 that includes a ceiling electrode portion 22a that is disposed on substantially the entire lower surface of the second solid electrolyte layer 6 that faces the first interior space 20, the outer pump electrode 23 that is disposed in a region of the upper surface of the second solid electrolyte layer 6 opposite the ceiling electrode portion 22a such that the outer pump electrode 23 is exposed to the exterior space, and the second solid electrolyte layer 6 that is interposed between these electrodes.

The inner pump electrode 22 is formed so as to extend over upper and lower solid electrolyte layers (the second solid electrolyte layer 6 and the first solid electrolyte layer 4) that define the first interior space 20 and the spacer layer 5 that defines side walls. Specifically, the ceiling electrode portion 22a is formed on the lower surface of the second solid electrolyte layer 6 that defines the ceiling surface of the first interior space 20, a bottom electrode portion 22b is formed on the upper surface of the first solid electrolyte layer 4 that defines the bottom surface thereof, side electrode portions (not illustrated) are formed on side wall surfaces (inner surfaces) of the spacer layer 5 that define both side wall portions of the first interior space 20 such that the ceiling electrode portion 22a and the bottom electrode portion 22b are connected to each other, and the side electrode portions are disposed such that a tunnel shaped structure is formed at positions at which the side electrode portions are disposed.

The inner pump electrode 22 and the outer pump electrode 23 are formed as porous cermet electrodes (for example, cermet electrodes composed of Pt containing 1% of Au and $ZrO_2$). The inner pump electrode 22 that comes into contact with the measurement-object gas is composed of material that has impaired ability to reduce NOx components in the measurement-object gas.

In the main pump cell 21, a desired pump voltage Vp0 is applied between the inner pump electrode 22 and the outer pump electrode 23 to cause a pump current Ip0 to flow in a positive direction or in a negative direction between the inner pump electrode 22 and the outer pump electrode 23, and oxygen in the first interior space 20 can be consequently pumped out to the exterior space or the oxygen in the exterior space can be consequently pumped into the first interior space 20.

In order to detect the oxygen concentration (the oxygen partial pressure) in the atmosphere in the first interior space 20, an electrochemical sensor cell, that is, the main pump controlling oxygen partial pressure detection sensor cell 80 includes the inner pump electrode 22, the second solid electrolyte layer 6, the spacer layer 5, the first solid electrolyte layer 4, the third substrate layer 3, and the reference electrode 42.

An electromotive force V0 in the main pump controlling oxygen partial pressure detection sensor cell 80 is measured and the oxygen concentration (the oxygen partial pressure) in the first interior space 20 is consequently known. Feedback control on the pump voltage Vp0 of a variable power supply 24 is implemented such that the electromotive force V0 becomes a target value and the pump current Ip0 is consequently controlled. This enables the oxygen concentration in the first interior space 20 to be held at a predetermined constant value.

The third diffusion controlling portion 30 gives a predetermined diffusion resistance to the measurement-object gas the oxygen concentration (oxygen partial pressure) of which has been controlled by operation of the main pump cell 21 in the first interior space 20 and guides the measurement-object gas toward the second interior space 40.

The second interior space 40 is formed as a space in which the auxiliary pump cell 50 adjusts the oxygen partial pressure of the measurement-object gas that is introduced via the third diffusion controlling portion 30 after the oxygen concentration (the oxygen partial pressure) is adjusted in the first interior space 20 in advance. This enables the oxygen concentration in the second interior space 40 to be kept constant with high precision, and the gas sensor 100 can consequently measure the NOx concentration with high precision.

The auxiliary pump cell 50 is an auxiliary electrochemical pump cell that includes an auxiliary pump electrode 51 that includes a ceiling electrode portion 51a that is disposed on substantially the entire lower surface of the second solid electrolyte layer 6 that faces the second interior space 40, the outer pump electrode 23 (which is not limited to the outer pump electrode 23, and a proper electrode outside the sensor element 101 suffices), and the second solid electrolyte layer 6.

The auxiliary pump electrode 51 is disposed in the second interior space 40 at a tunnel shaped structure as in the inner pump electrode 22 that is disposed in the first interior space 20 described above. That is, the ceiling electrode portion 51a is formed on the second solid electrolyte layer 6 that defines the ceiling surface of the second interior space 40, a bottom electrode portion 51b is formed on the first solid electrolyte layer 4 that defines the bottom surface of the second interior space 40, and there is the tunnel shaped structure in which side electrode portions (not illustrated) that connect the ceiling electrode portion 51a and the bottom electrode portion 51b to each other are formed on both wall surfaces of the spacer layer 5 that defines side walls of the second interior space 40. The auxiliary pump electrode 51 is composed of material that has impaired ability to reduce the NOx components in the measurement-object gas as in the inner pump electrode 22.

In the auxiliary pump cell 50, a desired voltage Vp1 is applied between the auxiliary pump electrode 51 and the outer pump electrode 23, and oxygen in the atmosphere in the second interior space 40 can be consequently pumped out to the exterior space or the oxygen in the exterior space can be consequently pumped into the second interior space 40.

In order to control the oxygen partial pressure in the atmosphere in the second interior space 40, an electrochemical sensor cell, that is, the auxiliary pump controlling oxygen partial pressure detection sensor cell 81 includes the auxiliary pump electrode 51, the reference electrode 42, the second solid electrolyte layer 6, the spacer layer 5, the first solid electrolyte layer 4, and the third substrate layer 3.

Pumping of the auxiliary pump cell 50 is performed by using a variable power supply 52 the voltage of which is controlled based on an electromotive force V1 that is detected by the auxiliary pump controlling oxygen partial pressure detection sensor cell 81. Consequently, the oxygen partial pressure in the atmosphere in the second interior space 40 is controlled to be a low partial pressure that does not substantially affect the measurement of NOx.

In addition to this, a pump current Ip1 thereof is used for control of the electromotive force of the main pump controlling oxygen partial pressure detection sensor cell 80. Specifically, the pump current Ip1 is inputted, as a control signal, into the main pump controlling oxygen partial pressure detection sensor cell 80, and the target value of the electromotive force V0 thereof described above is controlled, and a gradient of the oxygen partial pressure in the measurement-object gas that is introduced into the second interior space 40 via the third diffusion controlling portion 30 is consequently controlled so as to be always constant. In the case of a NOx sensor, the oxygen concentration in the second interior space 40 is held at a constant value of about 0.001 ppm by operation of the main pump cell 21 and the auxiliary pump cell 50.

The fourth diffusion controlling portion 60 gives a predetermined diffusion resistance to the measurement-object gas the oxygen concentration (oxygen partial pressure) of which has been controlled by operation of the auxiliary pump cell 50 in the second interior space 40 and guides the measurement-object gas toward the third interior space 61. The fourth diffusion controlling portion 60 serves a function of limiting the amount of NOx that flows into the third interior space 61.

The third interior space 61 is formed as a space in which a process for measuring the concentration of a nitrogen oxide (NOx) in the measurement-object gas that is introduced via the fourth diffusion controlling portion 60 is performed after the oxygen concentration (the oxygen partial pressure) is adjusted in the second interior space 40 in advance. The NOx concentration is mainly measured by operation of the measurement pump cell 41 in the third interior space 61.

The measurement pump cell 41 measures the NOx concentration in the measurement-object gas in the third interior space 61. The measurement pump cell 41 is an electrochemical pump cell that includes a measurement electrode 44 that is disposed on the upper surface of the first solid electrolyte layer 4 that faces the third interior space 61, the outer pump electrode 23, the second solid electrolyte layer 6, the spacer layer 5, and the first solid electrolyte layer 4. The measurement electrode 44 is a porous cermet electrode that is composed of material that has a higher level of the ability to the reduce the NOx components in the measurement-object gas than that of the inner pump electrode 22. The measurement electrode 44 also functions as a NOx reduction catalyst for reducing NOx contained in the atmosphere in the third interior space 61.

In the measurement pump cell 41, oxygen that is produced by decomposition of the nitrogen oxide in the atmosphere around the measurement electrode 44 is pumped out and the amount thereof can be detected as a pump current Ip2.

In order to detect the oxygen partial pressure around the measurement electrode 44, an electrochemical sensor cell, that is, the measurement pump controlling oxygen partial pressure detection sensor cell 82 includes the first solid electrolyte layer 4, the third substrate layer 3, the measurement electrode 44, and the reference electrode 42. A variable power supply 46 is controlled based on an electromotive force V2 that is detected by the measurement pump controlling oxygen partial pressure detection sensor cell 82.

The measurement-object gas that is guided into the second interior space 40 reaches the measurement electrode 44 in the third interior space 61 via the fourth diffusion controlling portion 60 with the oxygen partial pressure controlled. The nitrogen oxide in the measurement-object gas around the measurement electrode 44 is reduced ($2NO \rightarrow N_2 + O_2$) and oxygen is produced. The produced oxygen is pumped by the measurement pump cell 41. At this time, a voltage Vp2 of the variable power supply 46 is controlled such that the electromotive force V2 that is detected by the measurement pump controlling oxygen partial pressure detection sensor cell 82 is constant (target value). The amount of the oxygen that is produced around the measurement electrode 44 is proportional to the concentration of the nitrogen oxide in the measurement-object gas, and a nitrogen oxide concentration in the measurement-object gas is calculated by using the pump current Ip2 in the measurement pump cell 41.

The electrochemical sensor cell 83 includes the second solid electrolyte layer 6, the spacer layer 5, the first solid electrolyte layer 4, the third substrate layer 3, the outer pump electrode 23, and the reference electrode 42. The oxygen partial pressure in the measurement-object gas outside the sensor can be detected by using an electromotive force (a voltage Vref) that is obtained by the sensor cell 83.

In the gas sensor 100 with this structure, the measurement-object gas the oxygen partial pressure of which is always held at a constant low value (value that does not substantially affect the measurement of NOx) is provided to the measurement pump cell 41 by operation of the main pump cell 21 and the auxiliary pump cell 50. Accordingly, the NOx concentration in the measurement-object gas can be known based on the pump current Ip2 that flows with the result that oxygen that is produced by reduction of NOx substantially in proportion to the NOx concentration in the measurement-object gas is pumped out by the measurement pump cell 41.

The sensor element 101 also includes a heater portion 70 that serves a temperature adjustment function of heating the sensor element 101 and maintaining temperature thereof in order to improve oxygen ion conductivity of the solid electrolyte. The heater portion 70 includes a heater connector electrode 71, a heater 72, a through-hole 73, a heater insulating layer 74, and a pressure diffusing hole 75.

The heater connector electrode 71 is formed so as to be in contact with the lower surface of the first substrate layer 1. Connecting the heater connector electrode 71 to an external power supply enables electricity to be supplied from the outside to the heater portion 70.

The heater 72 is an electric resistor that is formed such that the electric resistor is interposed between the second substrate layer 2 and the third substrate layer 3 in the vertical direction. The heater 72 is connected to the heater connector electrode 71 with the through-hole 73 interposed therebetween and generates heat with the result that electricity is supplied from the outside via the heater connector electrode 71 to heat the solid electrolyte of which the sensor element 101 is composed and to maintain the temperature thereof.

The heater 72 is embedded in the entire region having a length from the first interior space 20 to the third interior space 61 and can adjust the temperature of the entire sensor element 101 to a temperature at which the solid electrolyte is activated.

The heater insulating layer 74 is composed of an insulator such as alumina on the upper and lower surfaces of the heater 72. The heater insulating layer 74 is formed to provide electrical insulation between the second substrate layer 2 and the heater 72 and electrical insulation between the third substrate layer 3 and the heater 72.

The pressure diffusing hole 75 is formed so as to extend through the third substrate layer 3 and the air introducing layer 48 and so as to communicate with the reference gas introducing space 43 and is formed to relieve an increase in inner pressure due to an increase in temperature of the inside of the heater insulating layer 74.

As illustrated in FIG. 2, the control device 90 includes the variable power supplies 17, 24, 46, and 52 described above and a control unit 91.

The control unit 91 is a microprocessor that includes a CPU 92 and a storage unit 94. The control unit 91 receives the electromotive force V0 that is detected by the main pump controlling oxygen partial pressure detection sensor cell 80, the electromotive force V1 that is detected by the auxiliary pump controlling oxygen partial pressure detection sensor cell 81, the electromotive force V2 that is detected by the measurement pump controlling oxygen partial pressure detection sensor cell 82, the voltage Vref that is detected by the sensor cell 83, the pump current Ip0$s$ that is detected by the preliminary pump cell 15, the pump current Ip0 that is detected by the main pump cell 21, the pump current Ip1 that is detected by the auxiliary pump cell 50, and the pump current Ip2 that is detected by the measurement pump cell 41. The control unit 91 controls the voltages Vp0$s$, Vp0, Vp1, and Vp2 that are outputted by the variable power supplies 17, 24, 46, and 52 to control the preliminary pump cell 15, the main pump cell 21, the measurement pump cell 41, and the auxiliary pump cell 50. The storage unit 94 stores, for example, target values Ip0$s$*, V0*, V1*, and V2* described later. The CPU 92 of the control unit 91 refers the target values Ip0$s$*, V0*, V1*, and V2* and controls the cells 15, 21, 41, and 50.

The control unit 91 performs a preliminary pump control process of controlling the preliminary pump cell 15 such that the constant pump current Ip0$s$ flows. Specifically, the control unit 91 implements feedback control on the voltage Vp0$s$ of the variable power supply 17 such that the pump current Ip0$s$ of the preliminary pump cell 15 becomes the constant target value Ip0$s$* to control the preliminary pump cell 15. The control unit 91 controls the voltage Vp0$s$ such that oxygen is pumped into the buffer space 12 in the preliminary pump control process but does not control the voltage Vp0$s$ such that oxygen is pumped out from the buffer space 12. Since the target value Ip0$s$* is determined to be a constant value, the control device 90 controls the preliminary pump cell 15 such that oxygen having a constant flow rate is pumped into the buffer space 12. Even when the measurement-object gas outside the sensor element 101 is a low-oxygen atmosphere (for example, an atmosphere the oxygen concentration of which is 0.1 volume % or less, less than 0.2 volume %, or less than 1 volume %), the target value Ip0$s$* is determined such that the measurement-object gas (that is, the measurement-object gas that is introduced into the first interior space 20) after oxygen is pumped into by the preliminary pump cell 15 does not become a low-oxygen atmosphere. In the case where the air-fuel ratio of the measurement-object gas is smaller than a theoretical air-fuel ratio, that is, in the case of a rich atmosphere, the measurement-object gas contains hydrocarbon (HC) or carbon monoxide as an unburned component, and the oxygen concentration can be obtained from the amount of oxygen that is required just enough to burn the unburned component. Accordingly, the oxygen concentration of the rich atmosphere is represented by a negative value. For this reason, for example, the target value Ip0$s$* is determined as described below. The minimum value of the oxygen concentration of the exhaust gas in various operation states of the internal combustion engine that uses the gas sensor 100 (the case where the minimum value decreases to a negative value is included) is investigated in advance. The target value Ip0$s$* is determined based on the amount of oxygen that is required to increase the minimum oxygen concentration of the measurement-object gas to an oxygen concentration higher than that of the low-oxygen atmosphere (for example, the oxygen concentration is more than 0.1 volume %, 0.2 volume % or more, or 1 volume % or more). The target value Ip0$s$* may be appropriately determined based on an experiment as described above or may be, for example, no less than 0.5 mA and no more than 3 mA. The control unit 91 may not implement feedback control on the voltage Vp0$s$ of the variable power supply 17 such that the pump current Ip0$s$ becomes the constant target value Ip0$s$* in the preliminary pump control process but may control the preliminary pump cell 15 such that the pump current Ip0$s$ becomes a constant value (the target value Ip0$s$*) by controlling the voltage Vp0$s$ of the variable power supply 17 such that the voltage becomes constant. When the measurement-object gas that is the low-oxygen atmosphere is introduced into the first interior space 20, it is thought that the inner pump electrode 22 acts as a catalyst and that NOx is reduced in the first interior space 20 before arrival at the third interior space 61. In the case where the measurement-object gas is the rich atmosphere and contains the unburned component, it is thought that NOx reacts with the unburned component and is reduced before the arrival at the third interior space 61. However, the measurement-object gas that is the low-oxygen atmosphere can be inhibited from being introduced into the first interior space 20 and the unburned component in the measurement-object gas can be reacted with oxygen in a manner in which the preliminary pump cell 15 pumps the oxygen into the buffer space 12. Accordingly, NOx is inhibited from being reduced before the arrival at the third interior space 61, and the accuracy of detection of the NOx concentration is improved. In many cases of, for example, a gasoline engine, the air-fuel ratio shifts within ratios close to the theoretical air-fuel ratio, and the measurement-object gas is always the low-oxygen atmosphere in some cases or is frequently the rich atmosphere in other cases. Also, in these cases, the NOx concentration can be detected with precision in a manner in which the preliminary pump cell 15 pumps into the oxygen.

The control unit 91 performs an auxiliary pump control process of controlling the auxiliary pump cell 50 such that the oxygen concentration in the second interior space 40 becomes a target concentration. Specifically, the control unit 91 controls the auxiliary pump cell 50 by implementing feedback control on the voltage Vp1 of the variable power supply 52 such that the electromotive force V1 becomes a constant value (referred to as a target value V1*). The target value V1* is determined such that the oxygen concentration in the second interior space 40 becomes a predetermined low concentration that does not substantially affect the measurement of NOx.

The control unit 91 performs a main pump control process of controlling the main pump cell 21 such that the pump current Ip1 that flows when the auxiliary pump cell 50 adjusts the oxygen concentration in the second interior space 40 becomes a target value (referred to as a target value Ip1*). Specifically, the control unit 91 sets (feedback control) a target value (referred to as a target value V0*) of the electromotive force V0, based on the pump current Ip1 such that the pump current Ip1 that flows at the voltage Vp1 becomes the constant target value Ip1*. The control unit 91 implements feedback control on the pump voltage Vp0 of the variable power supply 24 such that the electromotive force V0 becomes the target value V0* (that is, such that the oxygen concentration in the first interior space 20 becomes the target concentration). The gradient of the oxygen partial pressure in the measurement-object gas that is introduced into the second interior space 40 via the third diffusion controlling portion 30 is always kept constant by the main pump control process. The pump current Ip0 that flows in the main pump control process changes depending on the oxygen concentration in the measurement-object gas and the flow rate of oxygen that is pumped into by the preliminary pump cell 15. For this reason, the control unit 91 can detect the oxygen concentration in the measurement-object gas, based on the pump current Ip0.

The control unit 91 performs a measurement pump control process of controlling the measurement pump cell 41 such that oxygen that is produced in the third interior space 61 derivatively from the specific gas (here, NOx) is pumped out from the third interior space 61 to the outside, and the oxygen concentration in the third interior space 61 becomes a predetermined low concentration, based on the electromotive force V2. Specifically, the control unit 91 controls the measurement pump cell 41 by implementing feedback control on the voltage Vp2 of the variable power supply 46 such that the electromotive force V2 becomes a constant value (referred to as a target value V2*) (that is, the oxygen concentration in the third interior space 61 becomes a predetermined low concentration). Consequently, the oxygen is pumped out from the third interior space 61 such that the amount of the oxygen that is produced by reducing NOx in the measurement-object gas in the third interior space 61 becomes substantially zero. The control unit 91 obtains the pump current Ip2 as a detection value depending on the oxygen that is produced in the third interior space 61 derivatively from the specific gas (here, NOx) while the preliminary pump control process, the auxiliary pump control process, the main pump control process, and the measurement pump control process described above are performed and calculates the NOx concentration in the measurement-object gas, based on the pump current Ip2.

The preliminary pump control process, the auxiliary pump control process, and the main pump control process are collectively referred to as a first control process.

The storage unit 94 stores, for example, a relational expression (for example, an expression of a linear function) or a map as a correspondence relationship (referred to as a specific gas concentration correspondence relationship) between the detection value (here, the pump current Ip2) and the specific gas concentration (here, the NOx concentration). The relational expression or the map can be obtained by an experiment in advance.

The present inventors investigated a relationship between the oxygen concentration in the measurement-object gas and the pump current Ip0. The relationship between the oxygen concentration in the measurement-object gas and the pump current Ip0 was investigated while the first control process described above was performed. A model gas was used as the measurement-object gas. As for the model gas, nitrogen was used as base gas, ethylene gas was used as gas that imitated the unburned component, temperature was set to 260° C., a flow rate was set to 50 L/min, the amount of added water was set to 3 volume %, a NO concentration was adjusted to 0 ppm, and the oxygen concentration was adjusted to −10, −5, 0, 5, 10, 18, or 21 volume %. The diameter of a pipe used to cause the model gas to flow was 20 mm. Subsequently, the relationship between the oxygen concentration in the measurement-object gas and the pump current Ip0 was investigated while a preliminary pump stop process of stopping operation of the preliminary pump cell 15 (the variable power supply 17 stopped applying the voltage Vp0s such that the pump current Ip0s did not flow), the auxiliary pump control process, and the main pump control process were performed. The preliminary pump stop process, the auxiliary pump control process, and the main pump control process are collectively referred to as a second control process. Ceramic paste was applied to the gas inlet 10 of the sensor element 101 to imitate a state in which a foreign substance was accumulated on the gas inlet 10 (and the first diffusion controlling portion 11). As for the sensor element 101 in this state, the relationship between the oxygen concentration in the measurement-object gas and the pump current Ip0 while the first control process was performed as described above and the relationship between the oxygen concentration in the measurement-object gas and the pump current Ip0 while the second control process was performed were investigated. Both of the relationships were investigated while not only the first control process or the second control process was performed but also the measurement pump control process was performed.

Figure 3:
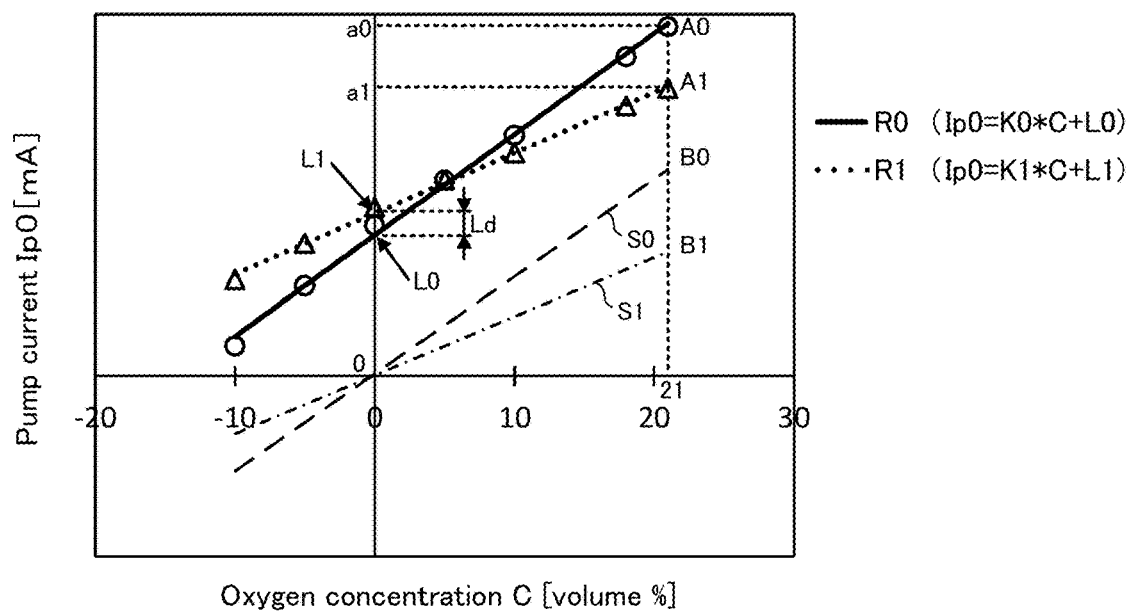
FIG. 3 is a graph illustrating a relationship between an oxygen concentration C and a pump current Ip0 during a first control process.
Figure 4:
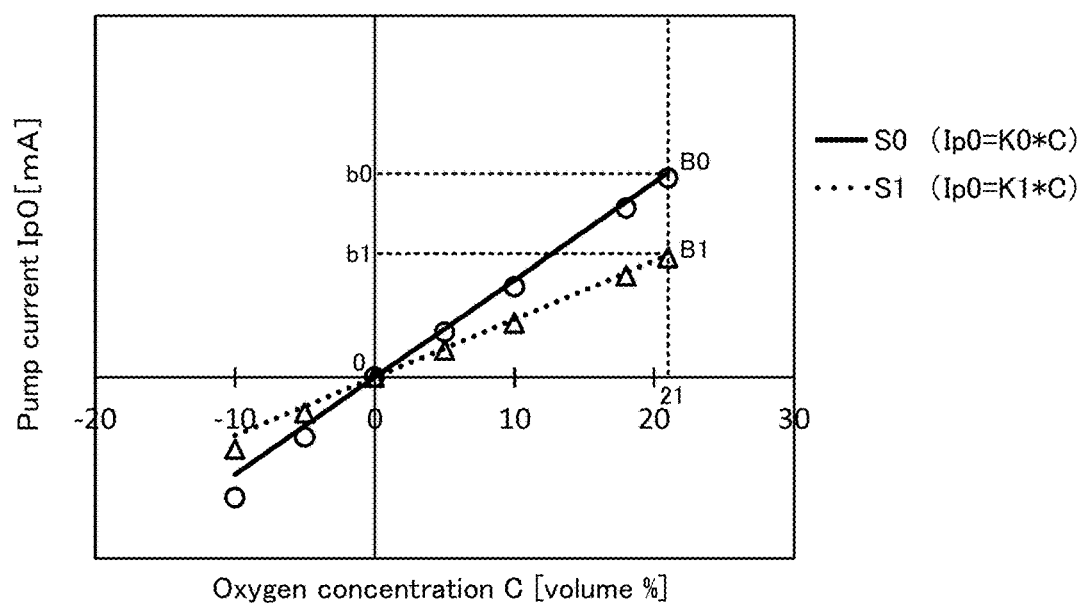
FIG. 4 is a graph illustrating a relationship between the oxygen concentration C and the pump current Ip0 during a second control process.

FIG. 3 is a graph illustrating a relationship between an oxygen concentration C and the pump current Ip0 during the first control process. FIG. 4 is a graph illustrating a relationship between the oxygen concentration C and the pump current Ip0 during the second control process. Circles that are plotted in FIG. 3 represent the result of measurement during the first control process with no accumulation of the foreign substance imitated. A straight line R0 that is illustrated by a thick line represents an approximate straight line that is derived based on the plotted result. Similarly, triangles and a straight line R1 that is illustrated by a dotted line in FIG. 3 represent the result of measurement during the first control process with accumulation of the foreign substance imitated and an approximate straight line based thereon. Circles and a straight line S0 that is illustrated by a thick line in FIG. 4 represent the result of measurement during the second control process with no accumulation of the foreign substance imitated and an approximate straight line based thereon. Triangles and a straight line S1 that is illustrated by a dotted line in FIG. 4 represent the result of measurement during the second control process with accumulation of the foreign substance imitated and an approximate straight line based thereon. In FIG. 3, the straight lines S0 and S1 in FIG. 4 are also illustrated for comparison with the straight lines R0 and R1. As for the pump current Ip0 in FIG. 3 and FIG. 4, current that flows when oxygen is pumped out from the first interior space 20 has a positive value, and current that flows when oxygen is pumped into the first interior space 20 has a negative value.

As seen from the circles and the straight line R0 in FIG. 3, the oxygen concentration C in the measurement-object gas and the pump current Ip0 while the first control process is performed have a linear correspondence relationship. That is, the relationship between the oxygen concentration C and the pump current Ip0 during the first control process approximates to a linear function (the straight line R0). For this reason, the use of the relationship of the straight line R0 enables the oxygen concentration C to be derived based on the pump current Ip0. According to the present embodiment, the storage unit 94 stores the relationship of expression (1) that represents the straight line R0 described later in advance as a first correspondence relationship. An inclination K0 and an intercept L0 in expression (1) described later are constants. The intercept L0 is the value of the pump current Ip0 when the oxygen concentration C is zero, and a point at which (C, Ip0)=(0, L0) is satisfied in FIG. 3 is referred to as the zero point of the straight line R0. As seen from the circles and the straight line S0 in FIG. 4, the oxygen concentration C in the measurement-object gas and the pump current Ip0 while the second control process is performed have a linear correspondence relationship. That is, the relationship between the oxygen concentration C and the pump current Ip0 during the second control process approximates to a linear function (the straight line S0). A difference between the first control process and the second control process is whether oxygen is pumped into by the preliminary pump cell 15. The value of the pump current Ip0s is controlled so as to be constant (such that the amount of oxygen that is pumped into by the preliminary pump cell 15 is constant) as described above, and the main pump cell 21 pumps out oxygen in an amount corresponding to the amount of the oxygen that is pumped into and the oxygen that is originally contained in the measurement-object gas in the first interior space 20. Accordingly, the straight line R0 is a straight line in the case where the pump current Ip0 is increased by a value corresponding to the amount of the oxygen that is pumped into by the preliminary pump cell 15 as compared with the straight line S0. That is, the straight line R0 and the straight line S0 have the same inclination but have different zero points (intercepts). During the second control process, that is, in a state in which no oxygen is pumped into by the preliminary pump cell 15 and the oxygen concentration in the measurement-object gas is zero, the oxygen concentration in the second interior space 40 is a low concentration even when the main pump cell 21 scarcely pumps into and pumps out oxygen, and the straight line S0 nearly passes through the origin. For this reason, as given as expression (2) described later, the straight line S0 has the same inclination K0 as the straight line R0 and an intercept of 0. According to the present embodiment, the storage unit 94 stores the relationship of expression (2) that represents the straight line S0 described later in advance as a second correspondence relationship. While the second control process is performed and the oxygen concentration C is zero, the main pump cell 21 is controlled such that the pump current Ip1 becomes the constant target value Ip1*, that is, a certain amount of oxygen is always pumped out from the second interior space 40, and the main pump cell 21 is controlled such that oxygen in an amount corresponding to the target value Ip1* is pumped into the first interior space 20 in advance. Consequently, in a strict sense, the pump current Ip0 (that is, the intercept of the straight line S0) has a slightly negative value while the second control process is performed and the oxygen concentration C is zero. According to the present embodiment, the target value Ip1* is set to a very small value (for example, several µA). However, the pump current Ip0 is relatively large current and is measured in unit of mA in the investigation described above. An actually measured value of the pump current Ip0 when the oxygen concentration C was zero in FIG. 4 was 0 mA. In view of this, according to the present embodiment, the straight line S0 is determined to be an approximate straight line that is based on the circles in FIG. 4 and that passes through the origin.

$$Ip0=K0*C+L0 \quad (1)$$

$$Ip0=K0*C \quad (2)$$

As seen from the triangles and the straight line R1 in FIG. 3, as for the sensor element 101 with accumulation of the foreign substance imitated, the oxygen concentration C and the pump current Ip0 have a linear correspondence relationship, but the inclination and the intercept (zero point) change from those of the straight line R0 corresponding to the correspondence relationship with no foreign substance accumulated. Specifically, the straight line R1 is given as expression (3) described later, the inclination K1 of the straight line R1 is less than the inclination K0 of the straight line R0, and the intercept L1 of the straight line R1 changes from the intercept L0 of the straight line R0 and increases. For this reason, it was found that when a foreign substance such as soot is accumulated in the measurement-object gas flow section in the wake of the use of the gas sensor 100, the actual correspondence relationship (the straight line R1) diverges from the first correspondence relationship (the straight line R0) described above. The following reason can be thought. Diffusion resistance (for example, the diffusion resistance of the gas inlet 10 and the first diffusion controlling portion 11) near the entrance of the measurement-object gas flow section increases when the foreign substance is accumulated near the gas inlet 10, and the amount of the measurement-object gas that flows into the measurement-object gas flow section decreases.

Consequently, even when the oxygen concentration C has the same value, the amount of oxygen that flows into the measurement-object gas flow section from the outside decreases, and the pump current Ip0 decreases. For this reason, it is thought that the more the foreign substance is accumulated near the entrance of the measurement-object gas flow section, the smaller the inclination of the actual correspondence relationship between the oxygen concentration C and the pump current Ip0 while the first control process is performed as compared with the inclination of the first correspondence relationship (straight line R0) before the accumulation. Oxygen that is pumped into the buffer space 12 by the preliminary pump cell 15 during the first control process does not entirely flow toward the first interior space 20 in the downstream direction, but a part thereof moves in the upstream direction and flows from the sensor element 101 to the outside via the gas inlet 10. A proportion between oxygen that flows from the buffer space 12 in the upstream direction and oxygen that flows in the downstream direction is determined, for example, by a ratio between the diffusion resistance of the gas inlet 10 and the first diffusion controlling portion 11 and the diffusion resistance of the second diffusion controlling portion 13. Of the oxygen that is pumped into by the preliminary pump cell 15, the proportion of the oxygen that flows in the downstream direction changes when the foreign substance is accumulated near the entrance of the measurement-object gas flow section. Specifically, the more the foreign substance is accumulated near the entrance, the proportion of the oxygen that flows in the downstream direction increases with an increase in the diffusion resistance of the gas inlet 10 and the first diffusion controlling portion 11, and the value of the pump current Ip0 overall increases due to the increase. Consequently, it is thought that the more the foreign substance is accumulated near the entrance of the measurement-object gas flow section, the further the actual correspondence relationship between the oxygen concentration C and the pump current Ip0 while the first control process is performed shifts upward (a direction in which the pump current Ip0 increases) in FIG. 3 as compared with the first correspondence relationship (the straight line R0) before the accumulation. For this reason, it is thought that the more the foreign substance is accumulated, the more the zero point of the actual correspondence relationship between the oxygen concentration C and the pump current Ip0 while the first control process is performed diverges in the direction in which the pump current Ip0 increases as compared with the zero point of the first correspondence relationship (the straight line R0) before the accumulation (in FIG. 3, it changes from the intercept L0 into the intercept L1 larger than that).

$$Ip0 = K1 \cdot C + L1 \text{ (where } K1 < K0 \text{ and } L1 > L0 \text{)} \quad (3)$$

As seen from the triangles and the straight line S1 in FIG. 4, even as for the sensor element 101 with accumulation of the foreign substance imitated, only the inclination changes from that of the straight line S0 corresponding to the correspondence relationship with no foreign substance accumulated, and the intercept (zero point) does not change while the second control process is performed. As seen from FIG. 3 and FIG. 4, the inclination of the straight line S1 is equal to the inclination K1 of the straight line R1. That is, the straight line S1 is given as expression (4) described later. The reason is presumably that in the second control process, no oxygen is pumped into by the preliminary pump cell 15, and the zero point consequently does not change due to the accumulation of the foreign substance described above. Since the second control process includes the main pump control process and the auxiliary pump control process as in the first control process, regarding the change in the inclination due to the accumulation of the foreign substance described above, it is thought that the same change occurs regardless of the first control process or the second control process, and the inclination of the straight line S1 and the inclination of the straight line R1 are equal to the inclination K1.

$$Ip0 = K1 \cdot C \quad (4)$$

When the foreign substance is accumulated near the entrance of the measurement-object gas flow section in the wake of the use of the gas sensor 100, the correspondence relationship between the oxygen concentration C and the pump current Ip0 during the first control process changes such that the inclination changes and the zero point changes as described above. In particular, the zero point changes, and the value of the pump current Ip0 when the oxygen concentration C is zero consequently diverges (in FIG. 3, it diverges from the intercept L0 to the intercept L1). For this reason, the use of the first correspondence relationship (the straight line R0) that is stored in the storage unit 94 in advance results in a decrease in the accuracy of detection of the oxygen concentration C in the case where the oxygen concentration C is zero. In the case where the oxygen concentration C is zero, the air-fuel ratio (A/F) of the measurement-object gas is the theoretical air-fuel ratio (stoichiometry), and it is important to detect that the air-fuel ratio is the theoretical air-fuel ratio with precision. In view of this, the present inventors paid attention to that, as illustrated in FIG. 4, the inclination of the correspondence relationship between the oxygen concentration C and the pump current Ip0 during the second control process diverges similarly to the first control process but the zero point does not diverge and thought that this is used to correct the divergence of the zero point of the correspondence relationship between the oxygen concentration C and the pump current Ip0 during the first control process. An example thereof will now be described.

Figure 5:
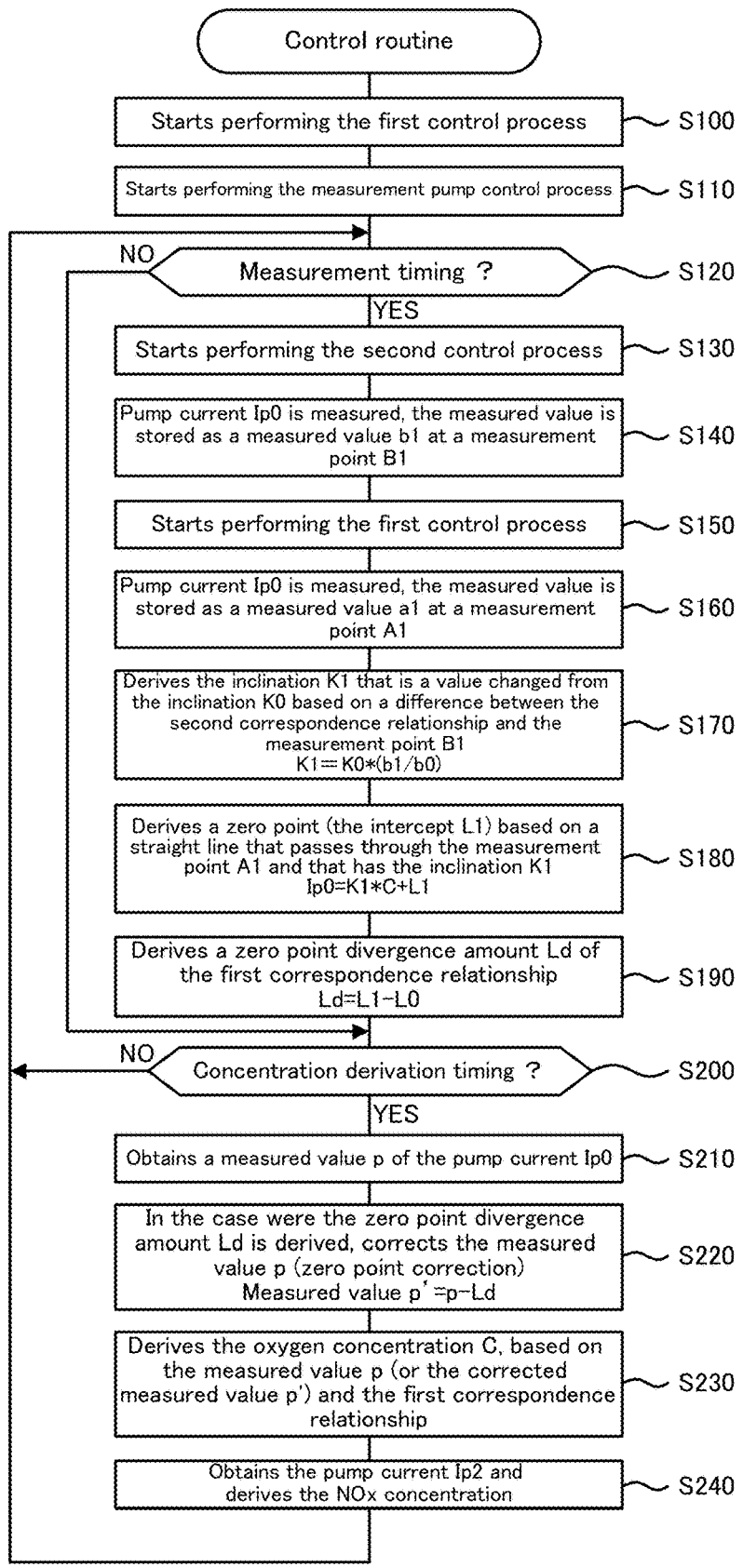
FIG. 5 is a flowchart of an example of control routine.

FIG. 5 is a flowchart illustrating an example of control routine that is performed by the control unit 91. In the control unit 91, the storage unit 94, for example, stores the routine. The control unit 91 starts the control routine, for example, when the temperature of the heater 72 becomes a target temperature (for example, 800° C.) by controlling power that is supplied to the heater 72 in advance by a heater power supply, not illustrated.

When the control routine starts, the CPU 92 of the control unit 91 first starts performing the first control process described above and the measurement pump control process described above (steps S100 and S110). Subsequently, the CPU 92 determines whether it is the measurement timing with which the pump current Ip0 is measured (step S120). The measurement timing is a timing with which the oxygen concentration in the measurement-object gas around the sensor element 101 is regarded as a known value. According to the present embodiment, the measurement timing is a timing with which the measurement-object gas around the sensor element 101 is regarded as the atmosphere. That is, the known value is the value (21 volume %) of the oxygen concentration in the atmosphere. According to the present embodiment, the measurement timing is a timing with which the measurement-object gas around the sensor element 101 is regarded as exhaust gas during fuel cutoff of the internal combustion engine. For example, the CPU 92 determines whether the control device 90 obtains fuel-cutoff-carrying-out information that represents fuel cutoff of the internal combustion engine is carried out from an engine ECU, not illustrated, for example, per predetermined time and determines that the fuel cutoff is carried out when the fuel-cutoff-carrying-out information is obtained. When a predetermined delay time has elapsed since the fuel-cutoff-carrying-out information is obtained, the CPU 92 determines that the measurement-object gas around the sensor element 101 is exposed to the exhaust gas during the fuel cutoff, that is, determines that it is the measurement timing. The delay time is determined in advance based on time required until the measurement-object gas flows from the internal combustion engine to the sensor element 101 and stored in the storage unit 94.

If it is determined that it is the measurement timing at step S120, the CPU 92 starts performing the second control process described above (step S130). The pump current Ip0 while the second control process is performed is measured (inputted), the measured value is stored as a measured value b1 (see FIG. 4) at a measurement point B1 in the storage unit 94 (step S140). The measurement point B1 is a point at which the known value of the oxygen concentration (here, 21 volume %) described above is relevant to the pump current Ip0 (=the measured value b1) while the second control process is performed. When the foreign substance is accumulated near the entrance of the measurement-object gas flow section of the sensor element 101 in the wake of the use of the gas sensor 100, the correspondence relationship between the oxygen concentration C and the pump current Ip0 during the second control process changes from the straight line S0 corresponding to the initial (pre-accumulation) correspondence relationship as described above. For this reason, the measured value b1 at the measurement point B1 that is obtained at step S140 is equal to a value (a reference value b0 at a reference point B0 in FIG. 4) on the straight line S0 when the oxygen concentration C is 21 volume % if no foreign substance is accumulated but is smaller than the reference value b0 if the foreign substance is accumulated. Here, the measured value b1 at the measurement point B1 illustrated in FIG. 4 is measured because the foreign substance is accumulated.

Subsequently, the CPU 92 starts performing the first control process described above (step S150). The pump current Ip0 while the first control process is performed is measured (inputted), and the measured value is stored as a measured value a1 (see FIG. 3) at a measurement point A1 in the storage unit 94 (step S160). The measurement point A1 is a point at which the known value of the oxygen concentration (here, 21 volume %) described above is relevant to the pump current Ip0 (=the measured value a1) while the first control process is performed. When the foreign substance is accumulated near the entrance of the measurement-object gas flow section of the sensor element 101 in the wake of the use of the gas sensor 100, the correspondence relationship between the oxygen concentration C and the pump current Ip0 during the first control process changes from the straight line R0 corresponding to the initial (pre-accumulation) correspondence relationship. For this reason, the measured value a1 at the measurement point A1 that is obtained at step S160 is equal to a value (a reference value a0 at a reference point A0 in FIG. 3) on the straight line R0 when the oxygen concentration C is 21 volume % if no foreign substance is accumulated but differs from the reference value a0 if the foreign substance is accumulated. Here, the measured value a1 at the measurement point A1 illustrated in FIG. 3 is measured because the foreign substance is accumulated.

Subsequently, the CPU 92 derives the inclination K1 that is a value changed from the inclination K0 of the straight line S0 that represents the second correspondence relationship, based on a difference between the second correspondence relationship that is stored in the storage unit 94 and the measurement point B1 and causes the storage unit 94 to store the inclination K1 (step S170). For example, the CPU 92 derives the value of the inclination K1 by using the relationship of expression (5) described later. In expression (5) described later, "b1/b0" corresponds to the "difference between the second correspondence relationship and the measurement point B1". When the foreign substance is accumulated, the correspondence relationship between the oxygen concentration C and the pump current Ip0 during the second control process changes from the second correspondence relationship (the straight line S0) such that the inclination changes but the zero point does not change as described above. The changed correspondence relationship can be presumed to be a straight line (here, the straight line S1) that has the same zero point as the straight line S0 and that passes through the measurement point B1. The degree of the difference (for example, a ratio or a difference between the reference value b0 and the measured value b1) between the measurement point B1 and the second correspondence relationship (the straight line S0) in FIG. 4 is proportional to the degree of the change in the inclination from the straight line S0 into the straight line S1. Accordingly, the inclination K1 of the straight line S1 can be derived based on the difference between the second correspondence relationship and the measurement point B1. For example, the CPU 92 calculates the inclination K0 and the reference value b0, based on the second correspondence relationship (for example, expression (2)) that is stored in the storage unit 94 and derives the inclination K1 from expression (5) described later based on a read value and the measured value b1. Since the straight line S0 passes through the origin, the CPU 92 can derive the inclination K0 given as K0=b0/21 if the coordinates of the reference point B0, that is, (C, Ip0)=(21, b0) can be identified. For this reason, the storage unit 94 may store, as the second correspondence relationship, only information about the reference point B0 such as information that represents the coordinates of the reference point B0 is (C, Ip0)=(21, b0). The CPU 92 can derive the reference value b0 corresponding to the known oxygen concentration (here, 21 volume %) if the inclination K0 is stored as the second correspondence relationship in the storage unit 94. The second correspondence relationship that is stored in the storage unit 94 may be information that enables the second correspondence relationship (the straight line S0) to be identified, more specifically, information that is needed to derive the value of the inclination K1.

$$K1=K0*(b1/b0) \tag{5}$$

After the inclination K1 is derived, the CPU 92 derives a changed zero point (the intercept L1) corresponding to a zero point after the zero point (the intercept L0) of the first correspondence relationship (the straight line R0) diverges, based on a straight line that passes through the measurement point A1 and that has the inclination K1 and causes the storage unit 94 to store the changed zero point (step S180). When the foreign substance is accumulated, the correspondence relationship between the oxygen concentration C and the pump current Ip0 during the first control process changes from the first correspondence relationship (the straight line R0) such that the inclination and the zero point change as described above, and the changed inclination is equal to the inclination of the correspondence relationship between the oxygen concentration C and the pump current Ip0 during the second control process. For this reason, the inclination of the correspondence relationship that changes from the first correspondence relationship (the straight line R0) can be presumed to be equal to the inclination K1 that is derived at step S170. Accordingly, the correspondence relationship that changes from the first correspondence relationship can be presumed to be the straight line (here, the straight line R1) that passes through the measurement point A1 and that has the inclination K1, and the zero point (the intercept L1) of the straight line can be derived. For example, the CPU 92 can derive the changed zero point (the intercept L1) by using expression (3) described above to determine that the pump current Ip0 is equal to the measured value a1 and that C is equal to 21 volume % (the known oxygen concentration) and by using the value that is derived at step S170 as the inclination K1.

Based on the changed zero point (the intercept L1) that is derived and the zero point (the intercept L0) of the first correspondence relationship that is stored in the storage unit

94, the CPU 92 derives a zero point divergence amount Ld corresponding to a divergence therebetween and causes the storage unit 94 to store the zero point divergence amount Ld (step S190). The CPU 92 derives the zero point divergence amount Ld by, for example, expression (6) described below.

$$Ld=L1-L0 \quad (6)$$

After steps S130 to S190, or in the case where it is not the measurement timing at step S120, the CPU 92 determines whether it is a concentration derivation timing with which the NOx concentration and the oxygen concentration are derived (step S200). The CPU 92 determines that it is the concentration derivation timing, for example, whenever a predetermined time has elapsed or when an instruction for concentration derivation is inputted from the engine ECU. Since the second control process starts at step S130 and the first control process subsequently starts at step S150, the first control process is being performed when the CPU 92 performs a process at step S200 even after steps S130 to S190 or even when it is not the measurement timing at step S120.

If it is determined that it is the concentration derivation timing at step S200, the CPU 92 measures (inputs) the pump current Ip0 while the first control process is performed and obtains a measured value p that is the measured value (step S210). Subsequently, in the case were the zero point divergence amount Ld is derived at step S190, the CPU 92 makes zero point correction to correct the obtained measured value p (step S220). The zero point correction is a process of correcting the divergence of the zero point from the first correspondence relationship, in which according to the present embodiment, a corrected measured value p' is derived by expression (7) described below based on the measured value p and the zero point divergence amount Ld.

$$p'=p-Ld \quad (7)$$

The CPU 92 derives the oxygen concentration C, based on the measured value p (or the corrected measured value p') and the first correspondence relationship that is stored in the storage unit 94 (step S230). For example, in the case where the corrected measured value p' has not been derived, the CPU 92 derives the value of the oxygen concentration C when the pump current Ip0 is equal to the measured value p by using expression (1) for the first correspondence relationship. In the case where the corrected measured value p' has been derived, the CPU 92 derives the value of the oxygen concentration C when the pump current Ip0 is equal to the measured value p' by using expression (1) for the first correspondence relationship. The CPU 92 outputs the derived value of the oxygen concentration C to the engine ECU or causes the storage unit 94 to store the derived value. In the case where the measurement-object gas is the exhaust gas of the internal combustion engine, the CPU 92 may derive the air-fuel ratio as the oxygen concentration of the measurement-object gas at step S230. Since the air-fuel ratio of the exhaust gas and the oxygen concentration can be converted into each other, the air-fuel ratio can also be said to be a kind of oxygen concentration. A conversion formula of the oxygen concentration and the air-fuel ratio (A/F) is known (see, for example, Brettschneider, Johannes, "Berechnung des Liftverhaeltnisses λ von Luft-Kraftstoff-Gemsichen und des Einflusses on MeBfehlern auf λ", Bosch Technische Berichte, Band6, Heft 4, Seite 177-186, Stuttgart, 1979).

The corrected measured value p' is obtained by correcting the measured value p such that a divergence (a divergence from the intercept L0 to the intercept L1) from the zero point (the intercept L0) of the first correspondence relationship (the straight line R0) is canceled out. For this reason, the use of the corrected measured value p' at least enables the divergence of the zero point from the first correspondence relationship in the wake of the use of the gas sensor 100 to be corrected, and the accuracy of detection of the oxygen concentration C when the oxygen concentration C is zero can be inhibited from decreasing in the wake of the use of the gas sensor. That is, it can be at least detected that the value of the oxygen concentration C is 0 with precision. For example, in the case where the zero point of the first correspondence relationship diverges (diverges from the intercept L0 to the intercept L1), the measured value p when the actual oxygen concentration C in the measurement-object gas is 0 also diverges from L0 to L1. In this case, the corrected measured value p' satisfies L0 (=p−Ld=L1−Ld), and the value of the oxygen concentration C is correctly derived as a value of 0, based on the corrected measured value p' and the first correspondence relationship. The oxygen concentration C is derived as a positive value when the corrected measured value p' is larger than L0, the oxygen concentration C is derived as a negative value when the corrected measured value p' is smaller than L0, and positive and negative values of the oxygen concentration are correctly derived. According to the present embodiment, the oxygen concentration C is derived by using the first correspondence relationship at step S230, even when the first correspondence relationship (the straight line R0) changes into, for example, the straight line R1. For this reason, a change from the inclination K0 into the inclination K1 is not corrected, and when the actual oxygen concentration C in the measurement-object gas is not 0, the larger the difference of the oxygen concentration C from 0, the larger the difference between the derived value of the oxygen concentration C and the actual value. In the case where the engine ECU controls the internal combustion engine, for example, such that the value of the oxygen concentration C becomes 0 (that is, the air-fuel ratio becomes the theoretical air-fuel ratio), whether the value of the oxygen concentration C is 0 (whether the air-fuel ratio is the theoretical air-fuel ratio) and whether the value of the oxygen concentration C is a positive or negative value (whether the measurement-object gas is the rich atmosphere or the lean atmosphere) are more important. For this reason, it is important to correct the divergence of the zero point, and the difference described above is unlikely to be a problem unlike the divergence of the zero point.

The CPU 92 measures (inputs) the pump current Ip2 while the first control process and the measurement pump control process are performed and derives the NOx concentration in the measurement-object gas, based on the measured value and the specific gas concentration correspondence relationship that is stored in the storage unit 94 (step S240). The CPU 92 outputs the derived value of the oxygen concentration C to the engine ECU or causes the storage unit 94 to store the derived value.

After step S240 or in the case where it is not the concentration derivation timing at step S200, the CPU 92 performs processes after step S120. The CPU 92 derives the zero point divergence amount Ld whenever it is determined to be the measurement timing at step S120 and makes the zero point correction by using the zero point divergence amount Ld that is lastly derived at step S220, that is, the latest zero point divergence amount Ld.

The correspondence relationships between components according to the present embodiment and components according to the present invention will now be clarified. The multilayer body of the layers 1 to 6 that are stacked in this order according to the present embodiment corresponds to an element body according to the present invention, the buffer space 12 corresponds to a preliminary chamber, the preliminary pump cell 15 corresponds to a preliminary pump cell, the first interior space 20 corresponds to a first interior space, the main pump cell 21 corresponds to a main pump cell, the second interior space 40 corresponds to a second interior space, the auxiliary pump cell 50 corresponds to an auxiliary pump cell, the third interior space 61 corresponds to a measurement chamber, the measurement electrode 44 corresponds to a measurement electrode, the reference electrode 42 corresponds to a reference electrode, the electromotive force V2 corresponds to a measurement voltage, the measurement pump controlling oxygen partial pressure detection sensor cell 82 corresponds to a measurement-voltage-detecting unit, the pump current Ip0s corresponds to a preliminary pump current, the pump current Ip1 corresponds to an auxiliary pump current, the pump current Ip2 corresponds to a detection value, the storage unit 94 corresponds to a storage unit, the pump current Ip0 corresponds to a main pump current, the CPU 92 of the control unit 91 corresponds to a specific-gas-concentration-detecting unit, an oxygen-concentration-detecting unit, and a measured-value-obtaining unit. The CPU 92 corresponds to an information-obtaining unit.

In the gas sensor 100 according to the present embodiment described above, the CPU 92 performs the second control process with the measurement timing with which the oxygen concentration in the measurement-object gas around the sensor element 101 is regarded as the known value and measures the pump current Ip0 that flows while the second control process is performed to obtain the measured value b1 at the measurement point B1 at which the known value of the oxygen concentration and the main pump current are relevant to each other. The CPU 92 detects the oxygen concentration in the measurement-object gas, based on the measured value p of the pump current Ip0 that flows while the first control process is performed and the information (here, information about the first correspondence relationship) about the zero point that is stored in the storage unit. The CPU 92 makes the zero point correction to correct the measured value p such that the divergence (the divergence from the intercept L0 to the intercept L1 in FIG. 3) of the zero point from the first correspondence relationship, based on the measured value b1 at the measurement point B1. More specifically, the CPU 92 makes the zero point correction, based on the difference between the second correspondence relationship that is stored in the storage unit 94 and the measurement point B1. The difference between the measurement point B1 and the second correspondence relationship correlates with the degree of the change in the inclination of the straight line that represents the correspondence relationship between the oxygen concentration and the pump current Ip0 as described above. The degree of the change in the inclination correlates with the degree of the accumulation of the foreign substance near the entrance of the measurement-object gas flow section, that is, the degree of the increase in the diffusion resistance near the entrance and hence correlates with the amount of the divergence of the zero point from the first correspondence relationship. For this reason, the difference between the measurement point B1 and the second correspondence relationship also correlates with the amount of the divergence of the zero point from the first correspondence relationship. For this reason, the divergence of the zero point from the first correspondence relationship due to the accumulation of the foreign substance can be corrected based on the difference between the measurement point B1 and the second correspondence relationship. Accordingly, the accuracy of detection of the oxygen concentration when the oxygen concentration in the measurement-object gas is zero can be inhibited from decreasing in the wake of the use of the gas sensor.

The CPU 92 measures the pump current Ip0 that flows while the first control process is performed with the measurement timing to obtain the measured value a1 at the measurement point A1 at which the known value of the oxygen concentration and the pump current Ip0 are relevant to each other. The CPU 92 makes the zero point correction, based on the measured value b1 at the measurement point B1 and the measured value a1 at the measurement point A1. More specifically, the CPU 92 makes the zero point correction, based on the difference between the second correspondence relationship and the measurement point B1, and the measured value a1. The degree of the difference between the second correspondence relationship and the measurement point B1 correlates with the degree of the change (the change from the inclination K0 into the inclination K1 in FIG. 3 and FIG. 4) in the inclination from the inclination of the first correspondence relationship and the inclination of the second correspondence relationship due to the accumulation of the foreign substance as described above. The measured value a1 is a value during the first control process and is affected by both of the change in the inclination and the change in the zero point as described above. For this reason, the divergence (the divergence from the intercept L0 to the intercept L1 in FIG. 3) of the zero point from the zero point of the first correspondence relationship due to the accumulation of the foreign substance can be grasped based on the difference between the second correspondence relationship and the measurement point B1, and the measured value a1, and the zero point correction can be consequently appropriately made.

The CPU 92 derives the inclination K1 that is a value changed from the inclination K0 of the straight line that represents the first correspondence relationship (and the second correspondence relationship), based on the measurement point B1. More specifically, the inclination K1 is derived based on the difference between the second correspondence relationship and the measurement point B1. The CPU 92 derives the changed zero point (the intercept L1 in FIG. 3) corresponding to the zero point after the zero point of the first correspondence relationship diverges, based on the straight line (the straight line R1 in FIG. 3) that passes through the measurement point A1 and that has the inclination K1 and makes the zero point correction, based on the changed zero point. In this way, the zero point correction can be appropriately made by deriving the changed zero point.

The measurement timing is the timing with which the measurement-object gas around the sensor element 101 is regarded as the atmosphere. When the measurement-object gas is the atmosphere, the oxygen concentration is regarded as the known value, and the measured value b1 can be appropriately obtained by regarding this timing as the measurement timing.

The measurement-object gas is the exhaust gas of the internal combustion engine, and the CPU 92 obtains the fuel-cutoff-carrying-out information that represents the fuel cutoff is carried out in the internal combustion engine. The CPU 92 detects the measurement timing, based on the obtained fuel-cutoff-carrying-out information. The exhaust gas of the internal combustion engine during the fuel cutoff is regarded as the atmosphere, and the CPU 92 can consequently appropriately detect the measurement timing in a manner in which the measurement timing is detected based on the fuel-cutoff-carrying-out information.

It goes without saying that the present invention is not limited to the embodiment described above and can be carried out in various aspects within the technical scope of the present invention.

For example, according to the embodiment described above, the CPU 92 makes the zero point correction by correcting the measured value p at step S220 but may alternatively make the zero point correction by correcting the first correspondence relationship that is stored in the storage unit 94. For example, the CPU 92 may determine corrected first correspondence relationship to be a straight line R0' (Ip0=K0*C+L0+Ld) obtained by shifting the straight line R0 that represents the first correspondence relationship such that the pump current Ip0 overall increases by the zero point divergence amount Ld at step S220 and may derive the oxygen concentration C, based on the measured value p and the corrected first correspondence relationship at step S230. Also, in this case, the divergence of the inclination of the first correspondence relationship is not corrected, but the divergence of the zero point is corrected (the information about the zero point of the first correspondence relationship is corrected) as in the embodiment described above, and the accuracy of detection of the oxygen concentration when the oxygen concentration in the measurement-object gas is zero can be consequently inhibited from decreasing in the wake of the use of the gas sensor. It can be said that the straight line R0' is a straight line (Ip0=K0*C+L1) that has the same inclination as the straight line R0 and the changed zero point (the intercept L1). For this reason, the intercept L1 can be derived at step S180 even when step S190 is omitted, and the straight line R0', that is, the corrected first correspondence relationship can be derived. The CPU 92 may cause the storage unit 94 to store the corrected first correspondence relationship and may use the corrected first correspondence relationship at step S230 until a next measurement timing. In this way, it is not necessary for the CPU 92 to derive the same corrected first correspondence relationship every time.

According to the embodiment described above, the CPU 92 corrects the divergence of the zero point of the first correspondence relationship in the wake of the use of the gas sensor 100 by deriving the corrected measured value p' at step S220 but may correct the change in the inclination of the first correspondence relationship in addition to this. For example, the CPU 92 may determine the corrected first correspondence relationship to be a straight line (the straight line R1 in FIG. 3) obtained by using the value of the changed inclination K1 that is derived at step S170 and the value of the changed intercept L1 that is derived at step S180 for expression (3) and may derive the oxygen concentration C, based on the measured value p and the corrected first correspondence relationship at step S230. In this way, not only the zero point correction is made but also the change in the inclination of the first correspondence relationship can be corrected, and this improves not only the accuracy of detection of the oxygen concentration C when the oxygen concentration C in the measurement-object gas is zero but also the accuracy of detection of the oxygen concentration C when the oxygen concentration is not zero.

According to the embodiment described above, the CPU 92 derives the changed inclination K1 and derives the changed zero point (the intercept L1) and the zero point divergence amount Ld by using this, but another deriving method may be used provided that at least the changed zero point or the zero point divergence amount Ld is derived. For example, the CPU 92 may derive the zero point divergence amount Ld, based on a difference between the amount of divergence between the measured value b1 and the reference value b0 that is the value of the pump current Ip0 relevant to the known value of the oxygen concentration in the second correspondence relationship and the amount of divergence between the measured value a1 and the reference value a0 that is the value of the pump current Ip0 relevant to the known value of the oxygen concentration in the first correspondence relationship. The amount of divergence (for example, a difference or a ratio) between the reference value b0 and the measured value b1 correlates with the change in the inclination from the first correspondence relationship and the second correspondence relationship described above, and the amount of divergence (for example, a difference or a ratio) between the reference value a0 and the measured value a1 correlates with the change in the inclination and the change in the zero point from the first correspondence relationship described above. For this reason, a difference (for example, a difference or a ratio) between these amounts of divergence correlates with the change in the zero point from the first correspondence relationship. Accordingly, the zero point divergence amount Ld can be derived based on the difference between these amounts of divergence, and the zero point correction can be appropriately made by using the zero point divergence amount Ld. The CPU 92 may derive the zero point divergence amount Ld, for example, based on expression (8) described later. The reference value a0 in expression (8) can be derived based on the first correspondence relationship that is stored in advance in the storage unit 94, and the reference value b0 can be derived based on the second correspondence relationship that is stored in advance in the storage unit 94. In expression (8), the units of the reference value a0, the measured value a1, the reference value b0, the measured value b1, and the zero point divergence amount Ld are the same unit of current (for example, mA).

$$Ld=(b0-b1)-(a0-a1) \qquad (8)$$

Also, in the case where expression (8) described above is used, the CPU 92 may correct the measured value p or may derive the corrected first correspondence relationship. In addition, the CPU 92 may derive, as the corrected first correspondence relationship, the correspondence relationship that is corrected such that the change in the inclination from the first correspondence relationship is corrected. For example, the CPU 92 first derives the changed zero point (the intercept L1) from the relationship of expression (6) described above, based on the zero point (the intercept L0) of the first correspondence relationship and the zero point divergence amount Ld that is derived by using expression (8). Subsequently, the CPU 92 may derive, as the corrected first correspondence relationship, a straight line that passes through the measurement point A1 that is measured at step S160 and the changed zero point (the intercept L1). Also, in this way, the CPU 92 can derive the corrected first correspondence relationship (the straight line R1 in FIG. 3). For example, the CPU 92 can derive the straight line that passes through the measurement point A1 and the changed zero point, that is, the corrected first correspondence relationship by using the coordinates of the measurement point A1, that is, (C, Ip0)=(21, a1) and the intercept L1 for expression (3) described above to derive the inclination K1. In this way, not only the zero point correction is made but also the change in the inclination of the first correspondence relationship can be corrected. Accordingly, not only the accuracy of detection of the oxygen concentration C when the oxygen concentration C in the measurement-object gas is zero but also the accuracy of detection of the oxygen concentration C when the oxygen concentration is not zero are improved.

According to the embodiment described above, the CPU 92 derives and outputs the oxygen concentration C, based on the corrected measured value p' and the first correspondence relationship but is not limited to the case where the value of the oxygen concentration C is derived and may detect the oxygen concentration in another manner. For example, the CPU 92 may detect the air-fuel ratio as the oxygen concentration in the measurement-object gas. The CPU 92 may determine whether the oxygen concentration is zero (whether the air-fuel ratio is the theoretical air-fuel ratio) or may determine whether the oxygen concentration is in a predetermined range that can be regarded as zero (whether the air-fuel ratio is regarded as the theoretical air-fuel ratio) to detect the oxygen concentration. The CPU 92 may determine whether the oxygen concentration has a positive value (whether the measurement-object gas is the lean atmosphere) or may determine whether the oxygen concentration has a negative value (whether the measurement-object gas is the rich atmosphere) to detect the oxygen concentration. The CPU 92 may make any one or more determinations and may output the result of detection (the result of the determinations) of the oxygen concentration to the engine ECU. In the case where these determinations are made, the divergence of the inclination of the first correspondence relationship less affects the accuracy of detection (the accuracy of the determinations). Accordingly, in this case, it is not necessary for the storage unit 94 to store the first correspondence relationship, provided that at least the information (for example, (0, L0) that represents the coordinates of the zero point) about the zero point (the intercept L0) in the first correspondence relationship is stored. Also, in this case, the determinations described above can be made by comparing the measured value p and the information (for example, the value of the intercept L0) about the zero point. Also, in this case, the CPU 92 can perform processes at steps S170 to S190 and S220 in FIG. 5, and the corrected measured value p' can be derived as in the embodiment described above. Comparison between the corrected measured value p' and the information (for example, the value of the intercept L0) about the zero point enables the accuracy of detection of the oxygen concentration when the oxygen concentration in the measurement-object gas is zero to be inhibited from decreasing in the wake of the use of the gas sensor. That is, the accuracy of the determinations described above can be inhibited from decreasing. For example, in the case where as a result of the comparison between the corrected measured value p' and L0, the corrected measured value p' is in a predetermined range in which there is almost no difference from the intercept L0, it may be determined that the air-fuel ratio is the theoretical air-fuel ratio, in the case where the corrected measured value p' exceeds the predetermined range and is more than the intercept L0, it may be determined that the measurement-object gas is the lean atmosphere, and in the case where the corrected measured value p' exceeds the predetermined range and is less than the intercept L0, it may be determined that the measurement-object gas is the rich atmosphere. Alternatively, the CPU 92 may correct the information about the zero point (for example, the intercept L0 is corrected to the intercept L1), may compare the measured value p and the corrected zero point, and may make the same determinations.

According to the embodiment described above, the storage unit 94 stores the second correspondence relationship in advance, and the CPU 92 derives the inclination K1, based on the difference between the second correspondence relationship and the measurement point B1 at step S170 but is not limited thereto. For example, the CPU 92 may derive the inclination K1 as the inclination of a straight line that passes through the measurement point B1 and the origin (the point at which the oxygen concentration and the pump current Ip0 are zero) in FIG. 4 at step S170. For example, the CPU 92 may derive the inclination K1, based on the relationship of expression (9) described later instead of expression (5) described above. Since there is a tendency that the more the foreign substance is accumulated in the measurement-object gas flow section, the more the measurement point B1 changes such that the measured value b1 decreases as described above, and the measurement point B1 is not affected by the change in the zero point described above, the measured value b1 at the measurement point B1 correlates with the degree of the change in the inclination described above. For this reason, the CPU 92 can derive the changed inclination K1, based on the measured value b1 at the measurement point B1 by using, for example, the relationship of expression (9) described later instead of the use of the second correspondence relationship that is stored in advance in the storage unit 94. In this case, the storage unit 94 may not store the second correspondence relationship. Also, in the case where the inclination K1 is derived by using the relationship of expression (9) described later, the CPU 92 can make the zero point correction by performing the processes after step S180 described above as in the embodiment described above. The CPU 92 can correct the change in the inclination of the first correspondence relationship in addition to the zero point correction as in a modification described above.

$$K1=(b1/21) \qquad (9)$$

According to the embodiment described above, the CPU 92 makes the zero point correction, based on the difference between the second correspondence relationship and the measurement point B1, and the measured value a1 at the measurement point A1 but may make the zero point correction in another manner. For example, a correspondence relationship between the difference (for example, the difference between the reference value b0 and the measured value b1) between the second correspondence relationship and the measurement point B1 and the zero point divergence amount Ld or the changed zero point (for example, the value of the intercept L1) may be investigated by an experiment, and the storage unit 94 may store a relational expression or a map that defines the correspondence relationship. The CPU 92 may derive the zero point divergence amount Ld, or the changed zero point, or both based on the difference between the second correspondence relationship and the measurement point B1, and the correspondence relationship that is stored in the storage unit 94 after step S140. The zero point correction may be made based on the derived value. Since the difference between the measurement point B1 and the second correspondence relationship also correlates with the amount of divergence of the zero point from the first correspondence relationship as described above, investigating the correspondence relationship described above and storing the correspondence relationship in advance in the storage unit 94 enable the zero point divergence amount Ld, or the changed zero point, or both to be derived without measuring the measured value a1 at the measurement point A1. A correspondence relationship between the measured value b1 at the measurement point B1 and the zero point divergence amount Ld or the changed zero point (for example, the value of the intercept L1) may be investigated by an experiment, and a relational expression or a map that defines the correspondence relationship may be stored in the storage unit 94. Also, in this way, the CPU 92 can derive the zero point divergence amount Ld, or the changed zero point, or both based on the measured value b1 at the measurement point B1 that is obtained at step S140 and the correspondence relationship that is stored in the storage unit 94. In this case, the storage unit 94 may not store the second correspondence relationship.

Figure 6:
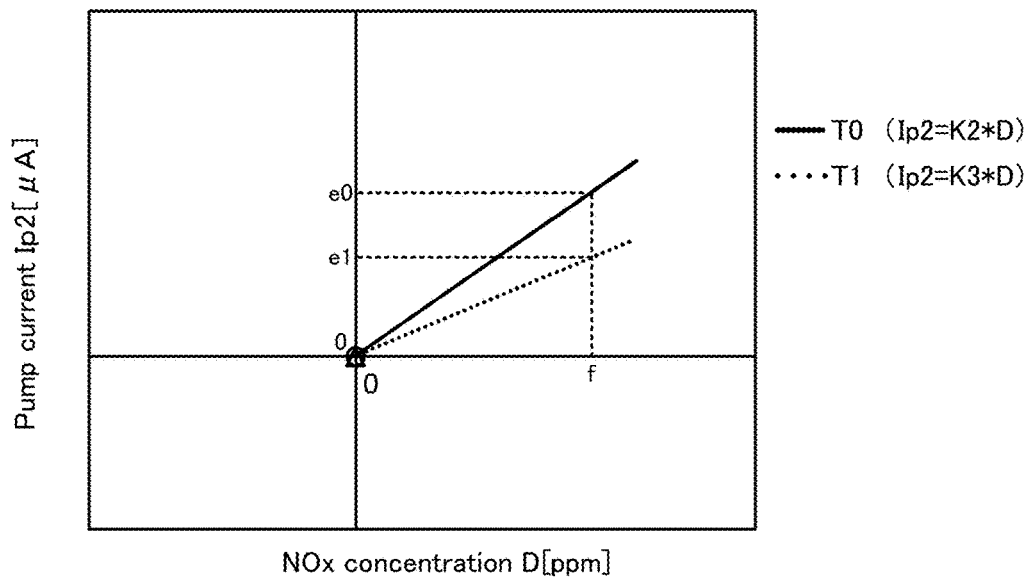
FIG. 6 is a graph illustrating a relationship between a NOx concentration D and a pump current Ip2 during the first control process.

According to the embodiment described above, the CPU 92 corrects the change in the correspondence relationship between the oxygen concentration in the measurement-object gas and the pump current Ip0 due to the accumulation of the foreign substance, based on the measured value b1 at the measurement point B1 but may correct the change in correspondence relationship between the specific gas concentration (for example, the NOx concentration) in the measurement-object gas and the detection value (for example, the pump current Ip2) depending on oxygen that is produced in the third interior space 61 derivatively from the specific gas, based on the measured value b1. FIG. 6 is a graph illustrating a relationship between the NOx concentration D [ppm] and the pump current Ip2 [μA] during the first control process. The pump current Ip2 in FIG. 6 represents current that flows when oxygen is pumped out from the third interior space 61 by using a positive value. A straight line T0 in FIG. 6 represents the correspondence relationship between the NOx concentration D in the measurement-object gas and the pump current Ip2 while the first control process is performed with no foreign substance accumulated in the measurement-object gas flow section. The straight line T0 is an example of the specific gas concentration correspondence relationship according to the embodiment described above. In the case where the relationship (for example, the relationship of expression (10) described later) of the straight line T0 is stored in advance in the storage unit 94, the CPU 92 derives the NOx concentration D, based on the measured pump current Ip2 and the specific gas concentration correspondence relationship, that is, the straight line T0 at step S240 described above. For example, in the case where the measured pump current Ip2 has a value e0, the CPU 92 derives a value f (=e0/K2) as the NOx concentration D (see FIG. 6). The inclination K2 is a constant. The more the foreign substance such as soot is accumulated in the measurement-object gas flow section in the wake of the use of the gas sensor 100, the more the diffusion resistance near the entrance of the measurement-object gas flow section, and the smaller the amount of the measurement-object gas that flows into the measurement-object gas flow section as described above. For this reason, the more the foreign substance is accumulated, the smaller the pump current Ip2 even when the NOx concentration in the measurement-object gas has the same value.

Accordingly, the more the foreign substance is accumulated, the smaller the inclination of the correspondence relationship between the NOx concentration in the measurement-object gas and the pump current Ip2 while the first control process is performed. For example, when the foreign substance is accumulated, as illustrated in FIG. 6, the inclination changes from that of the straight line T0 corresponding to the correspondence relationship with no foreign substance accumulated, and the correspondence relationship changes into a straight line T1 (expression (11) described later) that has an inclination K3 (<K2). That is, when the foreign substance is accumulated, the actual correspondence relationship (the straight line T1) diverges from the specific gas concentration correspondence relationship (the straight line T0) that is stored in advance in the storage unit 94 in some cases. The rate of change in the inclination from the straight line S0 into the straight line S1 in FIG. 4 due to the accumulation of the foreign substance and the rate of change in the inclination from the straight line T0 into the straight line T1 are caused by the same increase in the diffusion resistance and have the same value. For this reason, the measured value b1 at the measurement point B1 described above not only correlates with the degree of the change in the inclination of the correspondence relationship between the oxygen concentration C and the pump current Ip0 but also correlates with the degree of the change in the inclination of the correspondence relationship between the NOx concentration D and the pump current Ip2. For this reason, the pump current Ip2 or the specific gas concentration correspondence relationship can be corrected such that the change in the inclination from the straight line T0 into the straight line T1 is corrected based on the measured value b1 at the measurement point B1. For example, the CPU 92 derives the rate ΔK of change in the inclination from the straight line S0 into the straight line S1 in FIG. 3, based on the difference between the second correspondence relationship that is stored in the storage unit 94 and the measurement point B1 that is obtained at step S140. The rate of change in the inclination may be derived, for example, as given as ΔK=K0/K1 by using K1 that is derived at step S170 and K0 that is stored in the storage unit 94 or may be derived as given as ΔK=b0/b1 by using the measured value b1 that is measured at step S140 and the reference value b0 that is stored in the storage unit 94. The rate ΔK of change in the inclination is basically equal to the rate of change (=K2/K3) in the inclination from the straight line T0 into the straight line T1 in FIG. 6, and the rate ΔK of change in the inclination can be used to correct the pump current Ip2 or the specific gas concentration correspondence relationship. For example, the CPU 92 derives a corrected pump current Ip2' given as Ip2'=Ip2/ΔK by correcting the pump current Ip2 that is obtained at step S240 by using the rate ΔK of change in the derived inclination. The NOx concentration D is derived based on the corrected pump current Ip2' and the specific gas concentration correspondence relationship (the straight line T0) that is stored in the storage unit 94. For example, in the case where the correspondence relationship changes from the straight line T0 in FIG. 6 into the straight line T1 due to the accumulation of the foreign substance, and the actual NOx concentration has the value f in FIG. 6, the pump current Ip2 that is obtained at step S240 has a value e1. At this time, the corrected pump current Ip2' is given as Ip2'=e1/ΔK=e1/(K2/K3)=e0 and the value f can be derived as the correct NOx concentration, based on the corrected pump current Ip2' and the specific gas concentration correspondence relationship (the straight line T0) that is stored in the storage unit 94. Consequently, the accuracy of detection of the specific gas concentration can be inhibited from decreasing in the wake of the use of the gas sensor 100. In the case where the pump current Ip2 is not corrected but the specific gas concentration correspondence relationship that is stored in the storage unit 94 is corrected, the CPU 92 derives the inclination K3 given as K3=K2 ΔK, based on the inclination K2 of the specific gas concentration correspondence relationship (the straight line T0) and the rate ΔK of change in the inclination. Subsequently, the CPU 92 determines the straight line T1 (Ip2=K3*D) of the inclination K3 to be a corrected specific gas concentration correspondence relationship. The CPU 92 causes the storage unit 94 to store the corrected specific gas concentration correspondence relationship and derives the NOx concentration D, based on the pump current Ip2 that is obtained at step S240 and the corrected specific gas concentration correspondence relationship (the straight line T1). Also, in the case where the specific gas concentration correspondence relationship is thus corrected, the accuracy of detection of the specific gas concentration can be inhibited from decreasing in the wake of the use of the gas sensor 100.

$$Ip2=K2*D \quad (10)$$

$$Ip2=K3*D \quad (11)$$

In an example described above, the CPU 92 derives the rate ΔK of change in the inclination, based on the difference between the second correspondence relationship that is stored in the storage unit 94 and the measurement point B1 that is obtained at step S140 but is not limited thereto. It suffices that the rate ΔK of change in the inclination or the changed inclination K3 can be derived based on the measured value b1 at the measurement point B1. For example, even in the case where the storage unit 94 does not store the second correspondence relationship, the rate ΔK of change can be derived based on the measured value b1 at the measurement point B1. For example, the storage unit 94 may store a ratio Kr (=K2/K0) of the inclination K2 of the straight line T0 to the inclination K0 of the straight line S0 in advance, and the CPU 92 may derive the changed inclination K3 given as K3=K1*Kr, based on the inclination K1 based on the measured value b1 and the ratio Kr. Alternatively, since there is a correlation between the measured value b1 and the rate ΔK of change in the inclination and between the measured value b1 and the inclination K3 of the straight line T1, a correspondence relationship between the measured value b1 and the rate ΔK of change or the inclination K3 may be investigated in advance and stored in the storage unit 94, and the CPU 92 may derive the rate ΔK of change or the inclination K3, based on the correspondence relationship and the measured value b1.

According to the embodiment described above, the gas sensor 100 includes the preliminary pump cell 15, but the detection value or the specific gas concentration correspondence relationship can be corrected based on the measurement point B1 described above even in the case where the preliminary pump cell 15 is not included. In the case where the preliminary pump cell 15 is not included, the first control process and the second control process are the same process. The CPU 92 may omit steps S130, and S150 to S190, may obtain the measured value b1 at the measurement point B1 by performing a process at step S140 while the first control process (the main pump control process and the auxiliary pump control process) is performed, and may correct the detection value or the specific gas concentration correspondence relationship, based on the measured value b1 at the measurement point B1 as described above.

According to the embodiment described above, the CPU 92 performs processes at steps S130 to S190 if it is determined that it is the measurement timing at step S120 but may perform the processes at steps S170 to S190 with any timing other than the measurement timing. For example, the CPU 92 may perform the processes at steps S170 to S190 right before step S220.

According to the embodiment described above, the CPU 92 derives the oxygen concentration C and derives the NOx concentration if it is determined that it is the concentration derivation timing at step S200 but is not limited thereto. For example, the timing with which the oxygen concentration C is derived and the timing with which the NOx concentration is derived may differ from each other.

According to the embodiment described above, the second diffusion controlling portion 13 is located between the buffer space 12 and the first interior space 20 but is not limited thereto. For example, the second diffusion controlling portion 13 may be omitted, and the buffer space 12 and the first interior space 20 may be a single space. According to the embodiment described above, as illustrated in FIG. 1, the gas inlet 10 is located at the front end of the first diffusion controlling portion 11 but is not limited thereto, and the first diffusion controlling portion 11 may be located, for example, downstream of the gas inlet 10 in the direction of the flow of the measurement-object gas. That is, the first diffusion controlling portion 11 may be located nearer than the position in FIG. 1 to the rear. The first diffusion controlling portion 11, the second diffusion controlling portion 13, the third diffusion controlling portion 30, and the fourth diffusion controlling portion 60 are formed as the slits. However, one or more diffusion controlling portions, for example, may be porous, provided that the diffusion resistance can be given to the measurement-object gas.

According to the embodiment described above, the CPU 92 performs the measurement pump control process by implementing feedback control on the voltage Vp2 of the variable power supply 46 such that the electromotive force V2 becomes the target value V2* and detects the NOx concentration in the measurement-object gas, based on the detection value (the pump current Ip2) at this time but is not limited thereto. For example, the CPU 92 may perform the measurement pump control process by controlling the measurement pump cell 41 (for example, by controlling the voltage Vp2) such that the pump current Ip2 becomes the constant target value Ip2* and may detect the NOx concentration by using the detection value (the electromotive force V2). Since the measurement pump cell 41 is controlled such that the pump current Ip2 becomes the target value Ip2*, oxygen is pumped out from the third interior space 61 at a substantially constant flow rate. For this reason, the oxygen concentration in the third interior space 61 changes depending on the amount of oxygen that is produced with the result that NOx in the measurement-object gas is reduced in the third interior space 61, and the electromotive force V2 consequently changes. Accordingly, the electromotive force V2 has a value depending on the NOx concentration in the measurement-object gas. For this reason, the NOx concentration can be calculated based on the electromotive force V2. For example, the storage unit 94 stores a correspondence relationship between the electromotive force V2 and the NOx concentration in advance.

According to the embodiment described above, the gas sensor 100 detects the NOx concentration as the specific gas concentration but is not limited thereto and may detect another oxide concentration as the specific gas concentration. In the case where the specific gas is an oxide, oxygen is produced when the specific gas itself is reduced in the third interior space 61 as in the embodiment described above, and the CPU 92 can consequently detect the specific gas concentration by obtaining the detection value depending on the oxygen. The specific gas may be non-oxide such as ammonia. In the case where the specific gas is non-oxide, the specific gas is transformed to an oxide (for example, ammonia is transformed to NO), and oxygen is consequently produced when transformed gas is reduced in the third interior space 61. Accordingly, the CPU 92 can detect the specific gas concentration by obtaining the detection value depending on the oxygen. For example, when the preliminary pump electrode 16 contains metal having a catalyst function of facilitating oxidation of ammonia, the catalyst function of the preliminary pump electrode 16 enables the specific gas to be transformed to an oxide in the buffer space 12. The same can be true for the inner pump electrode 22. Since ammonia is transformed to NO as an oxide, an ammonia concentration is basically measured in the same principle as the NOx concentration is measured.

Figure 7:
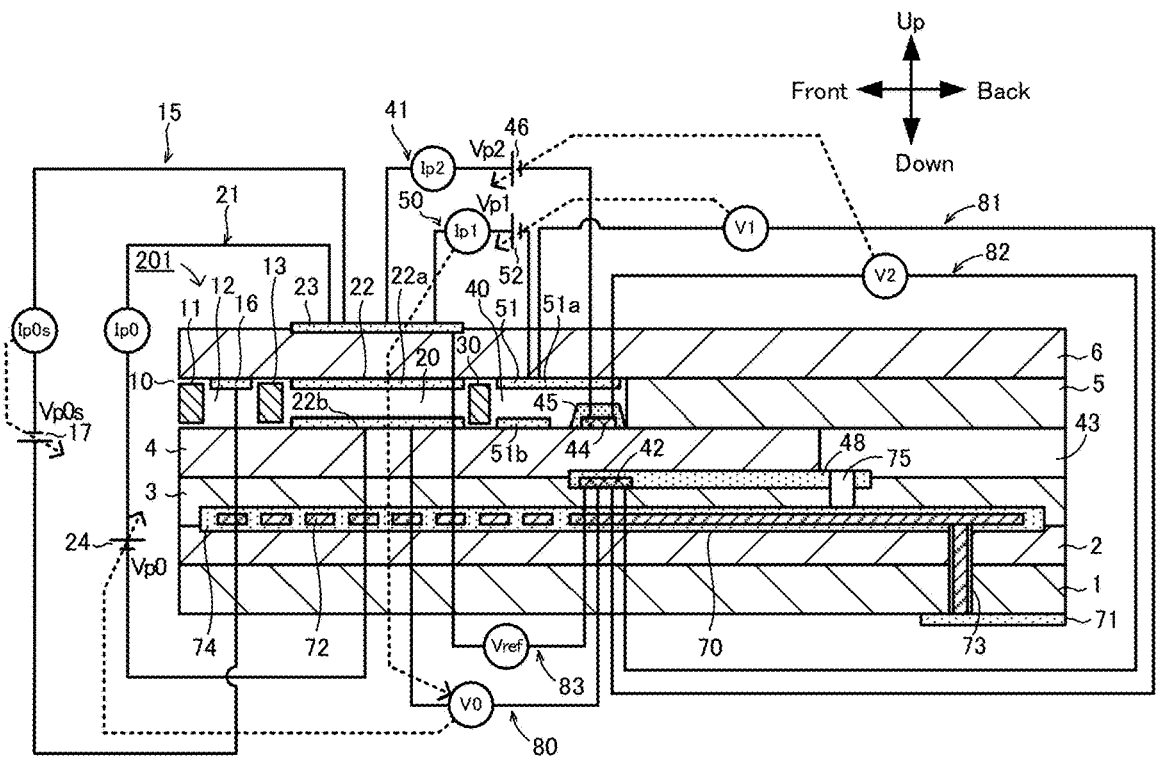
FIG. 7 is a schematic sectional view of a sensor element 201 according to a modification.

According to the embodiment described above, the sensor element 101 of the gas sensor 100 has the first interior space 20, the second interior space 40, and the third interior space 61 but is not limited thereto. For example, the third interior space 61 may not be formed as in a sensor element 201 in FIG. 7. In the sensor element 201 according to a modification illustrated in FIG. 7, the gas inlet 10, the first diffusion controlling portion 11, the buffer space 12, the second diffusion controlling portion 13, the first interior space 20, the third diffusion controlling portion 30, and the second interior space 40 are formed so as to be adjacent to each other and so as to communicate with each other in this order between the lower surface of the second solid electrolyte layer 6 and the upper surface of the first solid electrolyte layer 4. The measurement electrode 44 is disposed on the upper surface of the first solid electrolyte layer 4 in the second interior space 40. The measurement electrode 44 is covered by a fourth diffusion controlling portion 45. The fourth diffusion controlling portion 45 is a film composed of a ceramic porous material such as alumina ($Al_2O_3$). The fourth diffusion controlling portion 45 serves a function of limiting the amount of NOx that flows into the measurement electrode 44 as in the fourth diffusion controlling portion 60 according to the embodiment described above. The fourth diffusion controlling portion 45 also functions as the protection film of the measurement electrode 44. The ceiling electrode portion 51a of the auxiliary pump electrode 51 extends to a position right above the measurement electrode 44. Also, the sensor element 201 with this structure can detect the NOx concentration, for example, based on the pump current Ip2 as in the embodiment described above. In this case, the circumference of the measurement electrode 44 functions as the measurement chamber.

According to the embodiment described above, the element body of the sensor element 101 is the multilayer body of the solid electrolyte layers (the layers 1 to 6) but is not limited thereto. It suffices that the element body of the sensor element 101 includes at least one oxygen ion conducting solid electrolyte layer and contains the measurement-object gas flow section. For example, the layers 1 to 5 except for the second solid electrolyte layer 6 in FIG. 1 may be a structural layer (for example, an alumina layer) composed of material other that a solid electrolyte. In this case, the electrodes that are included in the sensor element 101 are disposed in the second solid electrolyte layer 6. For example, the measurement electrode 44 in FIG. 1 is disposed on the lower surface of the second solid electrolyte layer 6. The reference gas introducing space 43 is formed in the spacer layer 5 instead of the first solid electrolyte layer 4, the air introducing layer 48 is disposed between the second solid electrolyte layer 6 and the spacer layer 5 instead of between the first solid electrolyte layer 4 and the third substrate layer 3, and the reference electrode 42 is disposed at a position nearer than the third interior space 61 to the rear and on the lower surface of the second solid electrolyte layer 6.

According to the embodiment described above, in the main pump control process, the control unit 91 sets (feedback control) the target value V0* of the electromotive force V0, based on the pump current Ip1 such that the pump current Ip1 becomes the target value Ip1* and implements feedback control on the pump voltage Vp0 such that the electromotive force V0 becomes the target value V0* but may perform another process. For example, in the main pump control process, the control unit 91 may implement feedback control on the pump voltage Vp0, based on the pump current Ip1 such that the pump current Ip1 becomes the target value Ip1*. That is, the control unit 91 may omit obtaining the electromotive force V0 from the main pump controlling oxygen partial pressure detection sensor cell 80 and setting the target value V0* and may directly control (and hence control the pump current Ip0) the pump voltage Vp0, based on the pump current Ip1.

According to the embodiment described above, the outer pump electrode 23 serves as an outer preliminary pump electrode that is disposed on a part of the preliminary pump cell 15 that is to be exposed to the measurement-object gas outside the sensor element 101, an outer main pump electrode that is disposed on a part of the main pump cell 21 that is to be exposed to the measurement-object gas outside the sensor element 101, an outer auxiliary pump electrode that is disposed on a part of the auxiliary pump cell 50 that is to be exposed to the measurement-object gas outside the sensor element 101, and an outer measurement electrode that is disposed on a part of the measurement pump cell 41 that is to be exposed to the measurement-object gas outside the sensor element 101 but is not limited thereto. The outer preliminary pump electrode, the outer main pump electrode, the outer auxiliary pump electrode, or the outer measurement electrode, or some of the electrodes may be disposed outside the sensor element 101 separately from the outer pump electrode 23.

What is claimed is:

1. A gas sensor comprising:
an element body that has an oxygen ion conducting solid electrolyte layer and that contains a measurement-object gas flow section into which measurement-object gas is introduced for circulation;
a preliminary pump cell that pumps oxygen into a preliminary chamber of the measurement-object gas flow section;
a main pump cell that adjusts an oxygen concentration in a first interior space of the measurement-object gas flow section that is located downstream of the preliminary chamber;
an auxiliary pump cell that adjusts the oxygen concentration in a second interior space of the measurement-object gas flow section that is located downstream of the first interior space;
a measurement electrode that is disposed in a measurement chamber of the measurement-object gas flow section that is located downstream of the second interior space;
a reference electrode that is disposed in the element body and that comes into contact with reference gas that is serving as a reference for detection of a specific gas concentration in the measurement-object gas;
a measurement-voltage-detecting unit that detects a measurement voltage between the reference electrode and the measurement electrode;
a specific-gas-concentration-detecting unit that performs a first control process, that obtains a detection value depending on oxygen that is produced in the measurement chamber derivatively from specific gas, based on the measurement voltage while the first control process is performed, and that detects the specific gas concentration in the measurement-object gas, based on the detection value, the first control process including a preliminary pump control process of controlling the preliminary pump cell such that a constant preliminary pump current flows through the preliminary pump cell, an auxiliary pump control process of controlling the auxiliary pump cell such that the oxygen concentration in the second interior space becomes a target concentration, and a main pump control process of controlling the main pump cell such that an auxiliary pump current that flows when the auxiliary pump cell adjusts the oxygen concentration in the second interior space becomes a target value;

a storage unit that stores information about a zero point at which an oxygen concentration of zero and a main pump current are relevant to each other in a first correspondence relationship, where the first correspondence relationship is a linear correspondence relationship between the oxygen concentration in the measurement-object gas and the main pump current that flows through the main pump cell while the first control process is performed;

an oxygen-concentration-detecting unit that detects the oxygen concentration in the measurement-object gas, based on a measured value p of the main pump current that flows while the first control process is performed and the information about the zero point that is stored in the storage unit; and a measured-value-obtaining unit that performs a second control process and that obtains a measured value b1 at a measurement point B1 at which a known value of the oxygen concentration and the main pump current are relevant to each other by measuring the main pump current that flows while the second control process is performed with a measurement timing with which the oxygen concentration in the measurement-object gas around the element body is regarded as the known value, the second control process including a preliminary pump stop process of stopping operation of the preliminary pump cell, the auxiliary pump control process, and the main pump control process, wherein the oxygen-concentration-detecting unit makes zero point correction to correct the measured value p or the information about the zero point such that a divergence of the zero point from the first correspondence relationship is corrected based on the measured value b1 at the measurement point B1.

2. The gas sensor according to claim 1,
wherein the measured-value-obtaining unit obtains a measured value a1 at a measurement point A1 at which the known value of the oxygen concentration and the main pump current are relevant to each other by measuring the main pump current that flows while the first control process is performed with the measurement timing, and
wherein the oxygen-concentration-detecting unit makes the zero point correction, based on the measured value b1 and the measured value a1.

3. The gas sensor according to claim 2,
wherein the oxygen-concentration-detecting unit derives an inclination K1 that is a value changed from an inclination of a straight line that represents the first correspondence relationship, based on the measurement point B1, derives a changed zero point corresponding to a zero point after the zero point of the first correspondence relationship diverges, based on a straight line that passes through the measurement point A1 and that has an inclination equal to the inclination K1, and makes the zero point correction, based on the changed zero point.

4. The gas sensor according to claim 2,
wherein the storage unit stores the first correspondence relationship, and
wherein the oxygen-concentration-detecting unit derives an inclination K1 that is a value changed from an inclination of a straight line that represents the first correspondence relationship, based on the measurement point B1, derives a straight line that passes through the measurement point A1 and that has an inclination equal to the inclination K1 as a corrected first correspondence relationship, and detects the oxygen concentration in the measurement-object gas, based on the measured value p and the corrected first correspondence relationship.

5. The gas sensor according to claim 2,
wherein the storage unit stores a second correspondence relationship that represents a linear correspondence relationship between the oxygen concentration in the measurement-object gas and the main pump current that flows while the second control process is performed, and
wherein the oxygen-concentration-detecting unit derives a zero point divergence amount corresponding to an amount of the divergence of the zero point from the first correspondence relationship, based on a difference between an amount of divergence between a reference value b0 that is a value of the main pump current relevant to the known value of the oxygen concentration in the second correspondence relationship and the measured value b1, and an amount of divergence between a reference value a0 that is a value of the main pump current relevant to the known value of the oxygen concentration in the first correspondence relationship and the measured value a1 and makes the zero point correction, based on the zero point divergence amount.

6. The gas sensor according to claim 5,
wherein the oxygen-concentration-detecting unit derives a changed zero point corresponding to a zero point after the zero point of the first correspondence relationship diverges, based on the zero point of the first correspondence relationship and the zero point divergence amount, derives a straight line that passes through the measurement point A1 and the changed zero point as a corrected first correspondence relationship, and detects the oxygen concentration in the measurement-object gas, based on the measured value p and the corrected first correspondence relationship.

7. The gas sensor according to claim 1,
wherein the measurement timing is a timing with which the measurement-object gas around the element body is regarded as an atmosphere.

8. The gas sensor according to claim 7,
wherein the measurement-object gas is exhaust gas of an internal combustion engine,
further comprising an information-obtaining unit that obtains fuel-cutoff-carrying-out information that represents fuel cutoff is carried out in the internal combustion engine, and
wherein the measured-value-obtaining unit detects the measurement timing, based on the obtained fuel-cutoff-carrying-out information.

* * * * *